United States Patent [19]
Morvan

[11] Patent Number: 5,623,411
[45] Date of Patent: Apr. 22, 1997

[54] SYSTEM FOR CONTROLLING A PLURALITY OF PARALLEL HYDRAULIC CIRCUITS IN AN AIRCRAFT

[75] Inventor: Roger Morvan, Gratentour, France

[73] Assignee: Aerospatiale Societe Nationale Industrielle, Paris Cedex, France

[21] Appl. No.: 282,216

[22] Filed: Jul. 28, 1994

[30] Foreign Application Priority Data

Jul. 30, 1993 [FR] France ................................ 93 09431

[51] Int. Cl.$^6$ .................................................. H02H 3/05
[52] U.S. Cl. ................ 364/424.06; 364/424.04; 364/424.12; 324/73.1
[58] Field of Search ............................ 364/424.06, 200, 364/550, 424.03, 551.01, 580, 424.04; 73/40; 371/9; 324/158 R, 73.1; 434/29; 91/361, 434; 318/565, 562

[56] References Cited

U.S. PATENT DOCUMENTS

| | | | |
|---|---|---|---|
| 4,354,230 | 10/1982 | Murphy et al. | 364/200 |
| 4,412,280 | 10/1983 | Murphy et al. | 364/200 |
| 4,480,464 | 11/1984 | Whisenand et al. | 73/40 |
| 4,622,667 | 11/1986 | Yount | 371/9 |
| 4,631,722 | 12/1986 | Voss | 371/9 |
| 4,782,292 | 11/1988 | Gilfoy et al. | 324/158 R |
| 4,916,641 | 4/1990 | Bybee | 364/550 |
| 5,017,141 | 5/1991 | Relf et al. | 434/29 |
| 5,077,671 | 12/1991 | Leslie et al. | 364/424.03 |
| 5,081,903 | 1/1992 | Wardle et al. | 91/361 |
| 5,301,128 | 4/1994 | Bybee | 364/551.01 |
| 5,337,262 | 8/1994 | Luthi et al. | 364/580 |
| 5,422,553 | 6/1995 | MacLennan et al. | 318/565 |

FOREIGN PATENT DOCUMENTS 2683502  5/1993  France.

OTHER PUBLICATIONS

IEEE 1990 National Aerospace And Electronics Conference, Dayton, USA pp. 501–506 XP356829, Tuttle et al., "F–15 S/MTD IFPC Fault Tolerant Design".

9th Digital Avionics Systems Conference, Viriginia Beach, USA pp. 306–309 XP224577. Herbella, "Modularity Concepts for the Multi–Path Redundant Avionics Suite (MPRAS)".

Primary Examiner—Kevin J. Teska
Assistant Examiner—Russell W. Frejd
Attorney, Agent, or Firm—Michael N. Meller

[57] ABSTRACT

A system for the control of a plurality of independent parallel hydraulic circuits is provided. The system includes a first unit for monitoring the hydraulic circuits and for controlling equipment supplying such circuits. The first unit has wire logic circuits that requires no "programmable" computing member. A second unit is provided for recording causes of any unsatisfactory operation. Electrical circuits are also provided corresponding to the independent parallel hydraulic circuits. The electrical circuits are subject to advanced segregation type criteria. Information from the plurality of hydraulic circuits is combined to provide complete information for controlling the circuits.

16 Claims, 15 Drawing Sheets

SYSTEM FOR CONTROLLING A PLURALITY OF PARALLEL HYDRAULIC CIRCUITS IN AN AIRCRAFT

TECHNICAL FIELD

The present invention relates to a control system for several parallel independent circuits satisfying high security and safety requirements. More particularly, these independent circuits are the hydraulic circuits of a high or medium capacity aircraft.

BACKGROUND OF THE INVENTION

High capacity aircraft are equipped with hydraulic circuits to distribute energy necessary for systems requiring high power levels, such as devices for manipulating the landing gear, braking system or flight controls.

For safety reasons, three rigorously independent hydraulic circuits are provided for such aircraft and in certain cases, four. This is described in a reliability course given by Mr. Jacques de CORLIEU (pp 91 to 105; 1971) to the students of the Ecole Superieur de l'Aeronautique et de l'Espace. The monitoring and control functions with respect to such hydraulic circuits are not grouped in a single computer. Thus, on one aircraft type, these functions are provided by electric circuits integrating relay logics. The use of relays leads to a certain complexity of the installation as soon as it is necessary to have logics including numerous parameters. In another aircraft type, four computers are used just for monitoring the hydraulic circuits (one per circuit) without performing a control function. The control functions are carried out by the crew from a control panel located in the flight deck or cockpit. Using relays in an aircraft makes it impossible to provide complex logic automatic operations and an analysis and cohesion between different information obtained from the monitored systems. This is due to the installation and weight problems due to use of the relays. Accordingly, this analysis is carried out by the crew, which must make a decision to carry out necessary actions as a function of each situation. Although the procedures are well known to pilots, in certain situations, the reaction time is too long or an incorrect choice is made.

Moreover, the maintenance personnel for the hydraulic circuits must be well informed on the precautions which must be observed before and during the pressurization of a circuit, so as to avoid potential accidents. The search for possible malfunctions is time consuming and requires, apart from a good knowledge of the system, a good description of the detected fault and an expert analysis. If the maintenance personnel have to deal with several different aircrafts from different manufacturers, more documents must be consulted. Assistance in maintenance by identification and storage of a fault is provided by the "Built in Test Equipment" or "Bite", which mainly consists of recording the malfunction in a memory, whose content is then analyzed on the ground by maintenance specialists. The malfunctions detected during operation are not integrated into the relay logics of hydraulic circuits of prior art aircraft.

SUMMARY OF THE INVENTION

It is an object of the present invention to obviate these different problems. Another object is to provide a control system:

which monitors the hydraulic circuits and controls the equipment supplying such hydraulic circuits (independent circuits). These circuits may be common to aircraft of the two or four engine type, e.g. the Airbus A330 or A340, and take into account the special features inherent in each aircraft type ("pin-programme" function).

A circuit incorporating the features of the present invention maintains the independence of the hydraulic circuits so that no common point can produce a major fault affecting two of these circuits. It is also in accordance with the international standards and regulations in force in aeronautics and ensures the auto-monitoring of its operation. Further, it generates messages of its own possible faults or those affecting the peripheral equipments to which it is connected ("Bite" function).

The present invention also relates to a system for the control of several parallel independent circuits satisfying high safety requirements. The system incorporates a unit for monitoring these circuits and for controlling the equipment supplying the circuits. Such equipment may include wire logic circuits requiring no programmable computing member and a unit for recording the causes of unsatisfactory operation. The electric circuits corresponding to these different independent circuits are subject to advanced segregation criteria, wherein the information from the installation or exchanged between the different independent circuits is combined and wherein the system is intended to operate with different installations.

The system according to the present invention is in compliance with a level 1 segregation, which is a segregation of routes, permitting the passage of electric circuits (1M, 2M) allocated to the different hydraulic circuits. It also in compliance with a level 2 segregation, which is a segregation between the different circuits.

Advantageously, the system incorporating the principles of the present invention comprises a package in which a board or card, which carries out the distribution of the signals to the various boards or cards C1, C2, C3, C4, contains the electronic components making it possible to distribute a signal to one or more boards, or between boards when necessary, while maintaining the necessary segregation level. The wire connections between a board MB and each of the boards C1, C2, C3 and C4 are provided by independent line connectors, for each board, in order to maintain the segregation between the circuits.

A first board C1 is equipped with two line connectors P2 and P3 through which the signals of a first circuit (blue) for one of the connectors and certain signals of a second circuit (green) for the other connector are transmitted.

A second board C2 is equipped with two line connectors P4 and P5 through which the signals of a third circuit (yellow) for one of the connectors and the remaining signals of the second circuit (green) for the other connector are transmitted.

A third board C4, for receiving supplies, is equipped with two connectors P6 and P7 through which the signals of the first and second circuits (first part of the second circuit) for one of the connectors and the signals of the third and second circuits (second part of the second circuit) for the other connector are transmitted. The distribution of the circuits within the same connector is carried out so as to geographically isolate the circuits. This board is virtually subdivided into two zones by a frontier strip having no components or a printed circuit track.

A fourth board C3 groups the supplies and is equipped with a single line connector P1 in which unoccupied spaces are retained between the different connection groups, which brings about a geographical segregation.

Four supply units are located on the fourth board C3 so as to bring about a geographical subdivision of the surface of the board and so that the routings of the connecting tracks can themselves be geographically separated as between the different layers of the printed circuit. A supply is allocated to the first circuit (blue), one to the first part of the second circuit (green), another to the third circuit (yellow) and to the second part of the second circuit (green of engine MI). The final one is allocated to the control circuit of a ram air turbine (RAT), which is hydraulic power equipment, which must be electrically supplied separately from the other circuits.

The system according to the invention also maintains a level 3 segregation, which is a segregation between the different functions of each circuit using different components. Advantageously, these components are produced in Erasable Programmable Logic Device (EPLD) technology, which makes it possible to maintain the necessary architectural and functional segregation. Each component used for one of these functions cannot be used for another function. When networks of components are used, each network must contain components allocated only to a single circuit.

Advantageously, each earth or ground plan of each circuit has a tree-like architecture so as not to contain the ground loop.

The recording unit for the causes of unsatisfactory operation in use performs a "Bite" function, which receives all the entering and exiting signals, as well as certain internal signals. This "Bite" unit cannot interfere with the functional part of the system, since it is not possible to reverse the connections between the functional part and the "Bite" microprocessor.

In a particularly advantageous construction the independent circuits are hydraulic circuits and the installation is the hydraulic installation of a multi-engine transport aircraft.

The system according to the invention then makes it possible to perform a certain number of functions:

the control and monitoring of each hydraulic circuit, the signalling of engine-drive pumps, the manual and automatic control and signalling of electric pumps, the prevention in flight of the control of closing the internal leak measuring valves, the control and monitoring of a Ram Air Turbine (RAT), the control and monitoring of the pressure transfer unit (PTU, the control of the automatic closure of the hydraulic supply shutoff valves, the pulse control on a push-button light, the automatic closing of the hydraulic supply shutoff valves and the automatic extension of the RAT in the case of an engine explosion affecting all the circuits, airborne maintenance, initiated test, possible use on several aircraft types.

It is thus possible to optimize the filling level and volume of the fluid tanks in order not to have too low a fluid or an overflow as a result of temperature variations and consequently gain weight.

From each tank the system according to the invention receives analog information proportional to the fluid level contained in the tank. A temperature probe located on the fluid return line in the immediate vicinity of the tank makes it possible to calculate the fluid temperature value. On the basis of information such as the fluid volume in the hydraulic circuit, the mean volume expansion coefficient of the fluids used, the temperature of the fluid returning to the tank, the correcting coefficient of the non-uniformity of the temperature in the hydraulic circuit, the system evaluates the expansion or thermal contraction of the fluid, which is delivered (or sucked, if appropriate) into the tank. As the tanks are cylindrical for the part corresponding to the variation range, there is a direct correlation between the volume variation and the level of the liquid in the tank. This makes it possible to define the fluid quantity which must be added or removed in order to fill the tank to its optimum level.

The centralization of the necessary informations makes it possible to calculate for each tank, a controlling analog signal. This is accomplished by a four-position selector (one for each circuit and one for stoppage), a ground filling level indicator corrected for the variations due to the temperature with respect to the nominal level at 20° C. The indicator being located on the filling panel of fluid tanks of the hydraulic circuits, the respect of the filling correction indication as a function of the temperature making it possible to avoid any fluid overflow by excessive filling due to a temperature rise, but in particular avoiding a low level alarm by inadequate filling due to a fluid temperature drop. The following relation applies:

$$V = \frac{V'_b - 0.8k\Delta\theta(V_t + V_{ob}) - V_{ob}}{1 + 0.8k\Delta\theta}$$

with $\Delta\theta$ being the temperature variation compared with 20° C., $V'_b$, the quantity measured at 20° C.+$\Delta\theta$, $V_{ob}$, the nominal filling level at 20° C. and $V_t$, the volume of lines.

For safety reasons with respect to the maintenance personnel, the manual control of each electric pump and the pressure transfer unit (PTU) is automatically brought to the stop position when the electric power supply is disconnected. The leak measuring valve of the third circuit (yellow) is automatically closed during the control of the cargo doors in order to prevent any untimely movement of the flight controls. The operation of the pressure transfer unit of the third circuit to the second circuit is inhibited and an operation prevention signal is transmitted to the control computer of the slats and trailing edges. At the end of the manipulation of the doors, the leak measurement valve of the third circuit (yellow) is kept closed for a few seconds in order to enable the pressure accumulator of the circuit to empty by internal leaks of the equipment and thus prevent any untimely movement of the flight control surfaces. The control of the cargo door inhibits the control of the pressure transfer unit if the latter is not already operating. In the reverse case, the pressure in the third circuit is present because it is necessary for the operation of the pressure transfer unit and the operation of the third electric pump (yellow) is inhibited.

In order to obviate the effects of an engine explosion which would simultaneously affect all the hydraulic circuits, there is a low level detection. The rapid closure of the valves isolating the leak makes it possible to maintain the circuit operational by pressurizing it with the aid of an auxiliary pump. The supply shutoff valves of the suction lines of the two engine pumps of the second circuit (green) are automatically closed in the case of a low level alarm of the second tank (green) confirmed by the decoding of the liquid level gauge. The automatic extension of the RAT is activated in the case of a second confirmed low level alarm affecting another hydraulic circuit.

Therefore the invention relates to a system making it possible to group the hydraulic circuit monitoring and control functions in a single computer. At the same time, the constraints imposed by regulations for guaranteeing an adequate safety level (in particular the independence of the circuits) is maintained. The invention also relates to the efficiencies resulting from the grouping of the parameters of the hydraulic circuits in a single computer.

The system includes features mainly relating to the following:

- the architecture of the package (distribution of the boards, connectors, routing);
- the rules defined for ensuring segregation and its different levels (rules relative to routes, circuits, functions, electric power supply distribution, component blocks, geographical distribution of the components);
- the equations defined for each signalling and control function of the hydraulic circuit of aircraft;
- the solutions adopted for ensuring the possibility of using the system according to the invention on several different aircraft type, including options (equations able to implement several different functions selected by means of the pin-programme external of the computer), a pin-programme being produced by a combination of wires connected or not connected to earth or ground;
- the hydraulic tank filling correction indication function as a function of the level and temperature of the fluid in the tanks and in the circuit;
- the use of component technology of type EPLD ("Erasable Programmable Logical Device") in order to facilitate development, but also for contributing to the maintenance of the architectural and functional segregation.

The system according to the invention consequently has the following advantages:

It increases security and safety. It makes it possible to comply with safety analyses which increases the complexity of the system, particularly the monitoring and control of the hydraulic circuits. At the same time, it creates automatic operations in order to obviate the breakdowns and introduce so-called passive safety measures (e.g. prevention of accidents which could affect maintenance personnel) right from the time the design is started.

A weight and space gain. Neither the weight, nor the installation are affected by the degree of complexity of the logic system within the computer. By only using a single computing unit for all the circuits instead of one unit or computer for each circuit, the invention makes it possible to reduce the overall dimensions and weight so that the aircraft is less expensive and more profitable. It is presently accepted that for a weight gain of 1 kg in an aircraft, approximately 500 g of fuel are saved for each flight of 7000 to 8000 km.

Novel functions are performed, including those requiring calculations, such as the automatic closing of supply shutoff valves in order to obviate the effects of an engine explosion affecting the three hydraulic circuits, automatic extension of the RAT, indication of the filling correction of the level of hydraulic tanks as a function of the fluid temperature, etc.

Numerous parameters are taken into account (221 inputs-outputs on 250 possibilities offered by the connector being used on the hydraulic system management unit (HSMU) computer common to Airbus A330 and A340 aircraft).

The invention permits processing analog information and to make comparisons with values taken as references.

A system incorporating the principles of the present invention is also advantageous since there is only one computer for all the circuits of the same aircraft and the computer can be the same for two and four-engine aircraft. The concept is adaptable to other aircraft. Subsequent modifications, if necessary, are simplified and that this evolutional flexibility minimizes the effects of the aircraft circuit. It is also possible to easily incorporate options, as a function of the aircraft types or companies. An intermonitoring of certain information is possible from one circuit to another and certain redundancies are avoided.

The system improves maintenance, particularly by the incorporation into the computer of a "Bite" function. This permits the monitoring of the satisfactory operation of the computer and certain equipment from which it receives informations. Faults are entered in the memory of the HSMU computer and described in messages available on the centralized maintenance screen in the cockpit. The reduction of repair times, particularly at stopovers and consequently operating costs is also important.

DETAILED DESCRIPTION OF EMBODIMENTS

For safety reasons, the hydraulic circuits of an aircraft should be independent from each other. There can be three such circuits on high capacity aircraft and they are designated respectively hereafter by a color, namely a green circuit, a blue circuit and a yellow circuit. Routes represent the preferred paths within the aircraft of the different electric circuits, particularly with respect to the hydraulic circuits. The aim is to make these routes as independent as possible (segregation) so that local damage, e.g. a broken turbine blade severing certain circuits, does not lead to a total loss of an energy source, e.g. all the hydraulic energy.

Figure 1A:
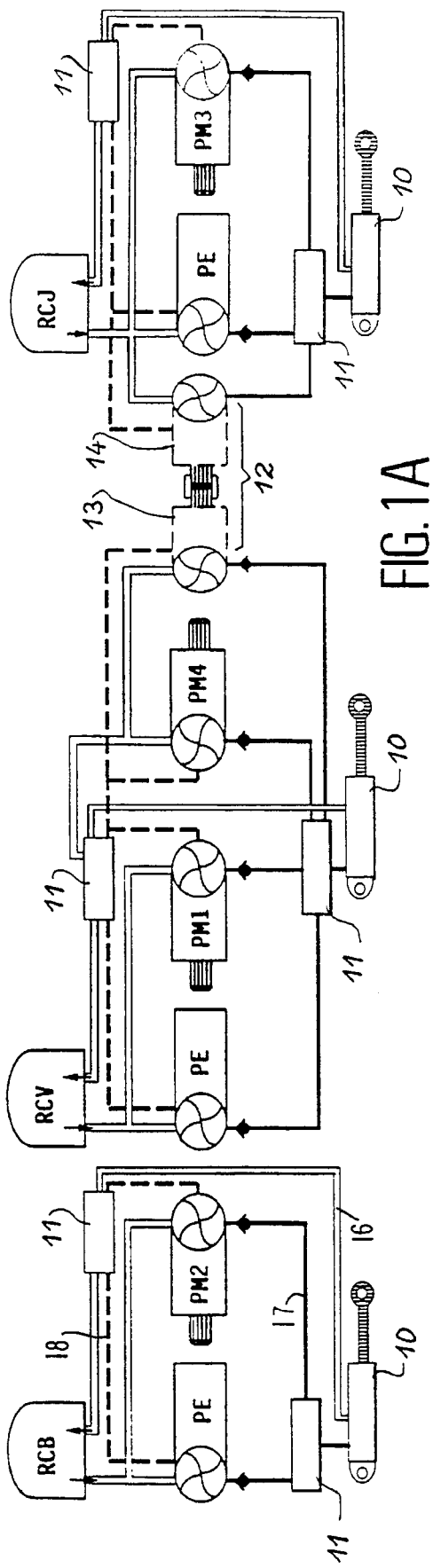
FIGS. 1A & 1B are diagrams of the hydraulic circuits of two aircraft types, the first having two engines and the second four engines.
Figure 1B:
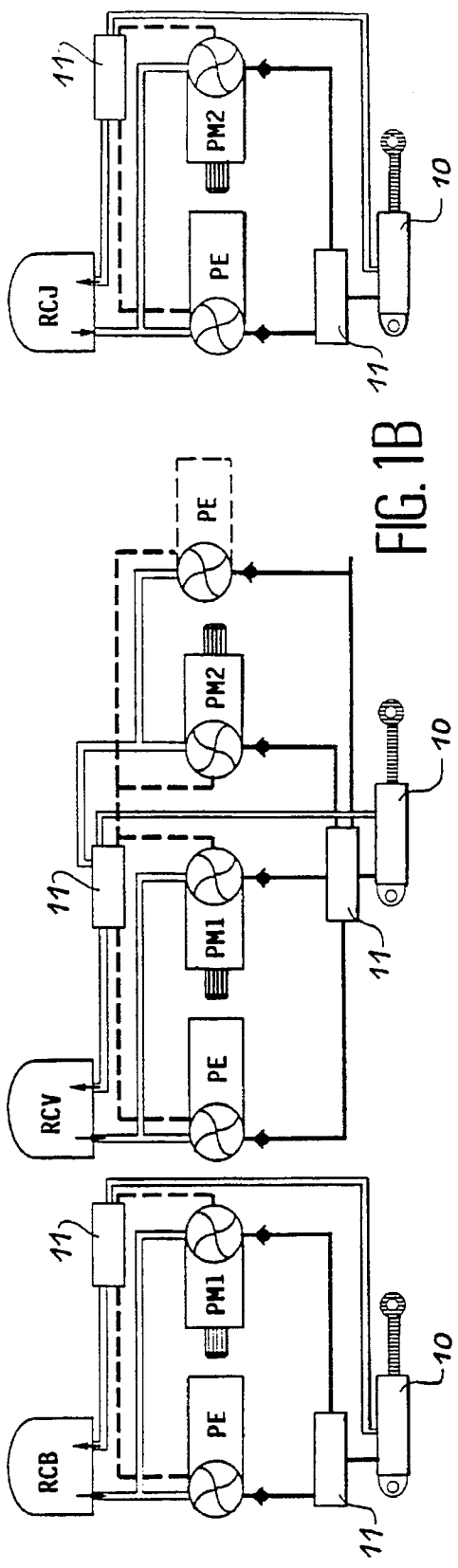

Referring to the drawings and more particularly to FIGS. 1A and 1B, a hydraulic circuit is shown comprising:

- an RCB (blue circuit), RCV (green circuit) or RCJ (yellow circuit) fluid tank;
- a pump for generating pressure and ensuring the flow of the fluid, engine-driven pumps PM1, PM2, PM3, PM4; electric pumps PE;

lines distributing the fluid between the different hydraulic equipment. In FIGS. 1A and 1B, the suction and return line is represented by a double line 16, the high pressure line by a thick line 17 and the case drain return line by a dotted line 18;

FIGS. 1A and 1B include apparatus such as jacks, motors, servocontrols, electric valves (10), whose operation is controlled by hydraulic pressure;

numerous equipment such as collectors 11, valves, etc. and pressure, level, temperature and other information sensors make it possible to monitor the operation of the system.

FIG. 1A also shows an optional transfer unit 12 incorporating a pump 13 and a motor 14.

Figure 2:
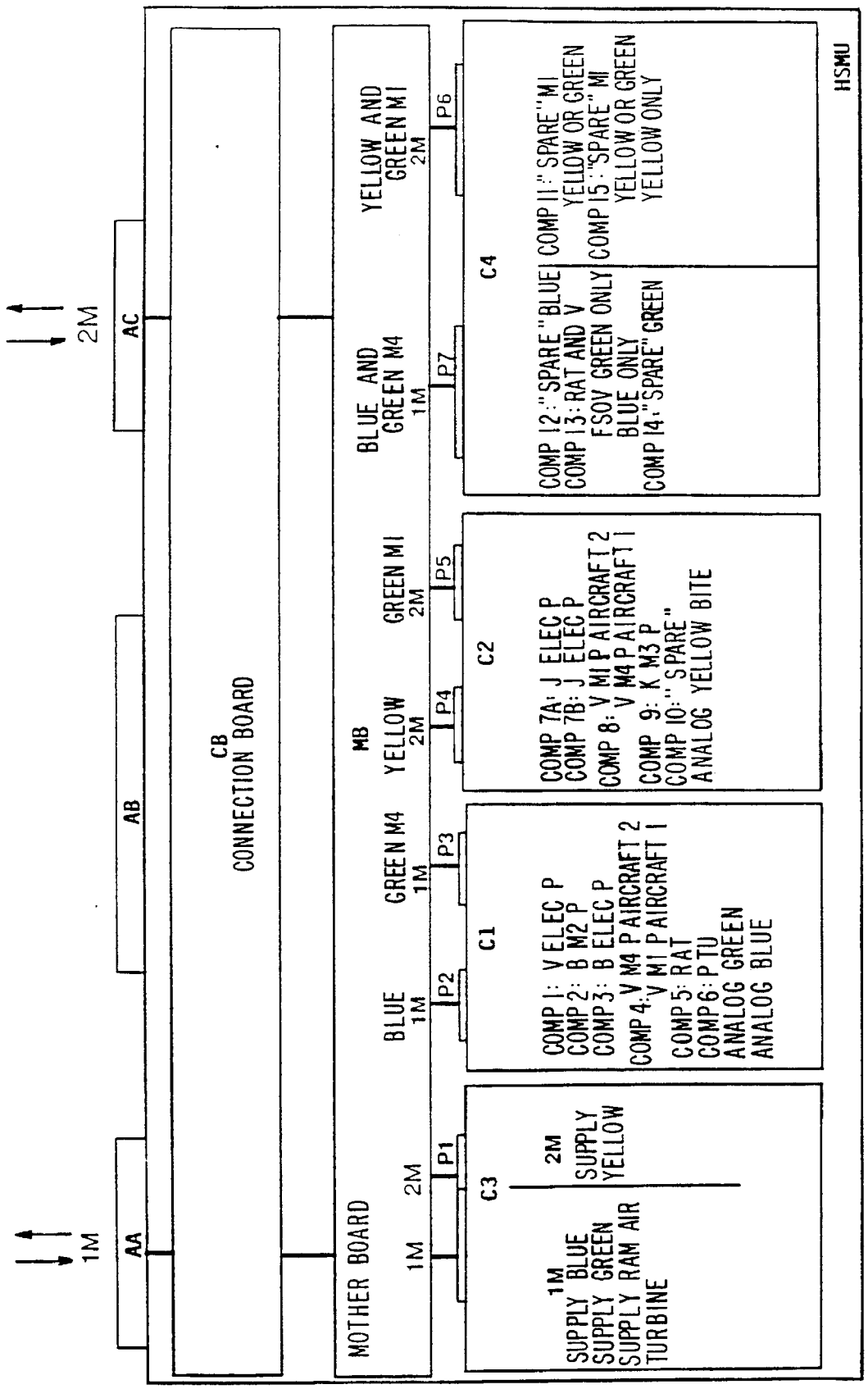
FIG. 2 is a wiring diagram illustrating the structure of a unit of the system according to a preferred embodiment of the invention.

The system according to the invention comprises a unit for monitoring these circuits and for controlling the equipment supplying the circuits realized by wired logic circuits and which will be referred to as the HSMU computer. The architecture of this computer is illustrated in FIG. 2. The computer maintains the segregation of the routes, permitting the passage of the electric circuits 1M and 2M respectively allocated to the hydraulic circuits:

Route 1M is indicated by blue and green (except the part of the green circuit relating to the first engine M1).

Route 2M is indicated by yellow and green (limited to the part of the green circuit relative to the first engine M1.

This segregation between the routes 1M and 2M is the level I segregation.

The wires relative to the green (engine M4) and blue (engine M2) circuits are connected to the package by the block AA of the package-aircraft interface plug (route 1M). The wires relative to the yellow (engine M3) and green (engine MI) circuits are connected to the block AC of the package-aircraft interface plug (route 2M).

A printed circuit board or connecting board, CB, receives the filters for protecting against the induced and conducted electromagnetic interference due to the inputs-outputs, as well as components providing a protection against lightning effects.

A Mother Board, MB, carries out the distribution of the signals to the various boards C1, C2, C3 and C4. It contains the electronic components making it possible to distribute a signal to one or more boards, or from board to board when necessary, whilst ensuring the necessary segregation level (by means of diodes, resistors, optical couplers, etc.). The Mother Board also contains certain protection against the effect of lightning which cannot be contained in the board CB due to lack of space.

The wire connections between the board MB and each of the boards C1, C2, C3 and C4 are provided respectively by two independent line connectors for each board, in order to maintain the segregation between the yellow, blue, green engine M4 circuits and the green engine M1 circuits.

The segregation between the blue, green and yellow circuits or color segregation is the level 2 segregation.

Board C1 has two line connectors P2 and P3 through which respectively pass the blue circuit signals and the green circuit signals (with the exception of the green circuit of engine M1).

The board C2 has two line connectors P4 and P5 through which respectively pass the yellow circuit signals and the green circuit signals of the engine M1.

The board C4 serves to receive supplies. The necessary segregation level is less for functions which are not basic. It still has two connectors P7 and P6 through which respectively pass the signals of the blue and green circuits (with the exception of the green circuit of engine M1) for the engine M4 and the signals of the yellow and green circuits of the engine M1. The distribution of the circuits within the same connector is such as to geographically isolate the colors. The board is virtually subdivided into two zones (1M and 2M) by a frontier strip having no components or printed circuit track.

Board C3 groups the supplies, which are the main heat dissipation sources. This makes it possible to simplify the heat evacuation problem. It is equipped with only a single line connector P1 due to lack of available space. However, the previously defined segregation levels I and 2 are achieved through unoccupied spaces being retained between the different connection groups. This brings about a geographical segregation. Four supply units are located on board C3 so that there is a geographical division of the surface of the board. The routings of the connecting tracks can be spatially separated in the surfaces between the different layers of the printed circuit. A supply is provided for the blue circuit, another to the green circuit (with the exception of the green circuit of engine M1), another to the yellow circuit and to the green circuit of the engine M1 and the final supply is provided for the control circuit of a Ram Air Turbine (RAT) which is hydraulic power equipment which must be supplied separately of the other circuits. The ram air turbine, which provides a new power source when the engines have become unavailable, consists of a wind-driven generator which, can extend outside the aircraft and is able to drive, in flight, a hydraulic pump or an alternator. The automatic closure function of the supply shutoff valves of the suction lines of the green engine pumps is also supplied by the latter supply source for the same reason.

A level 3 segregation is maintained between the different functions of each circuit. Thus, it is possible to have on board C1 six different components COMPi, e.g. of type EPLD, each of which performs a function of the blue or green circuit (with the exception of the green circuit of the engine M1) and RAT. Each component utilized for one of the functions cannot be used for another function. When networks of components are used, each network may only contain the components allocated to a single circuit (blue, green, yellow or RAT).

One function combines the control and monitoring of the same equipment, e.g. the control and monitoring of the same electric pump; or the control and monitoring of the automatic extension control of the RAT and the generation of the control signals associated with the automatic or manual extension of the RAT.

In the same way as hereinbefore, the architecture of board C2 maintains the level 3 segregation for the functions of the yellow and green circuits of the engine M1. It also has the built-in test equipment or "Bite" function, which monitors possible failures within the HSMU computer or peripheral equipment from which the computer receives information, e.g. when the value of an analog signal received by the computer is outside a given range. In order to carry out such internal and external monitoring, the microprocessor performing the "Bite" function receives all the signals entering and exiting the computer, as well as certain internal signals, as shown in FIG. 3.

Figure 3:
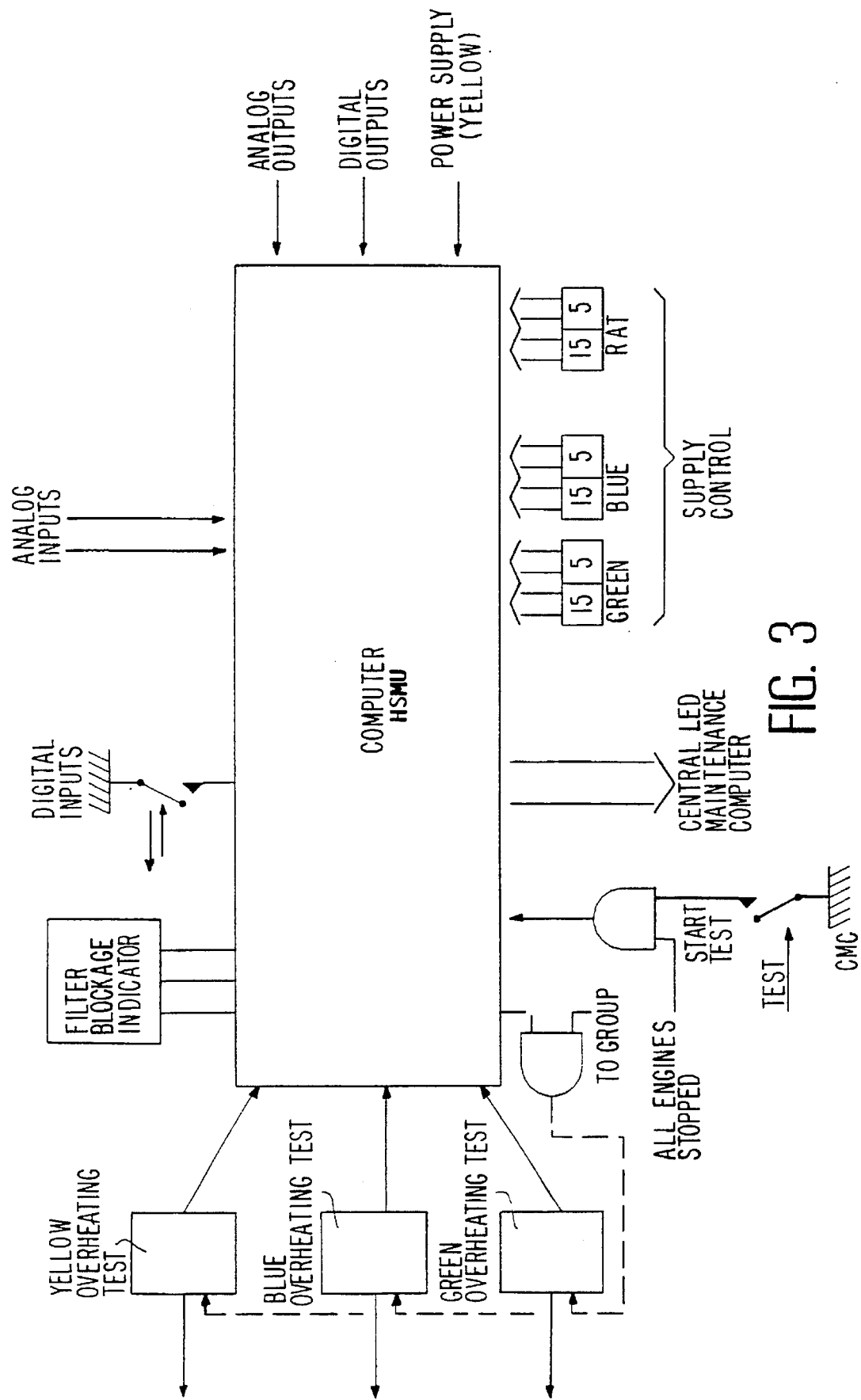
FIG. 3 is a block diagram illustrating the operation of the system according to a preferred embodiment of the invention.
Figure 4:
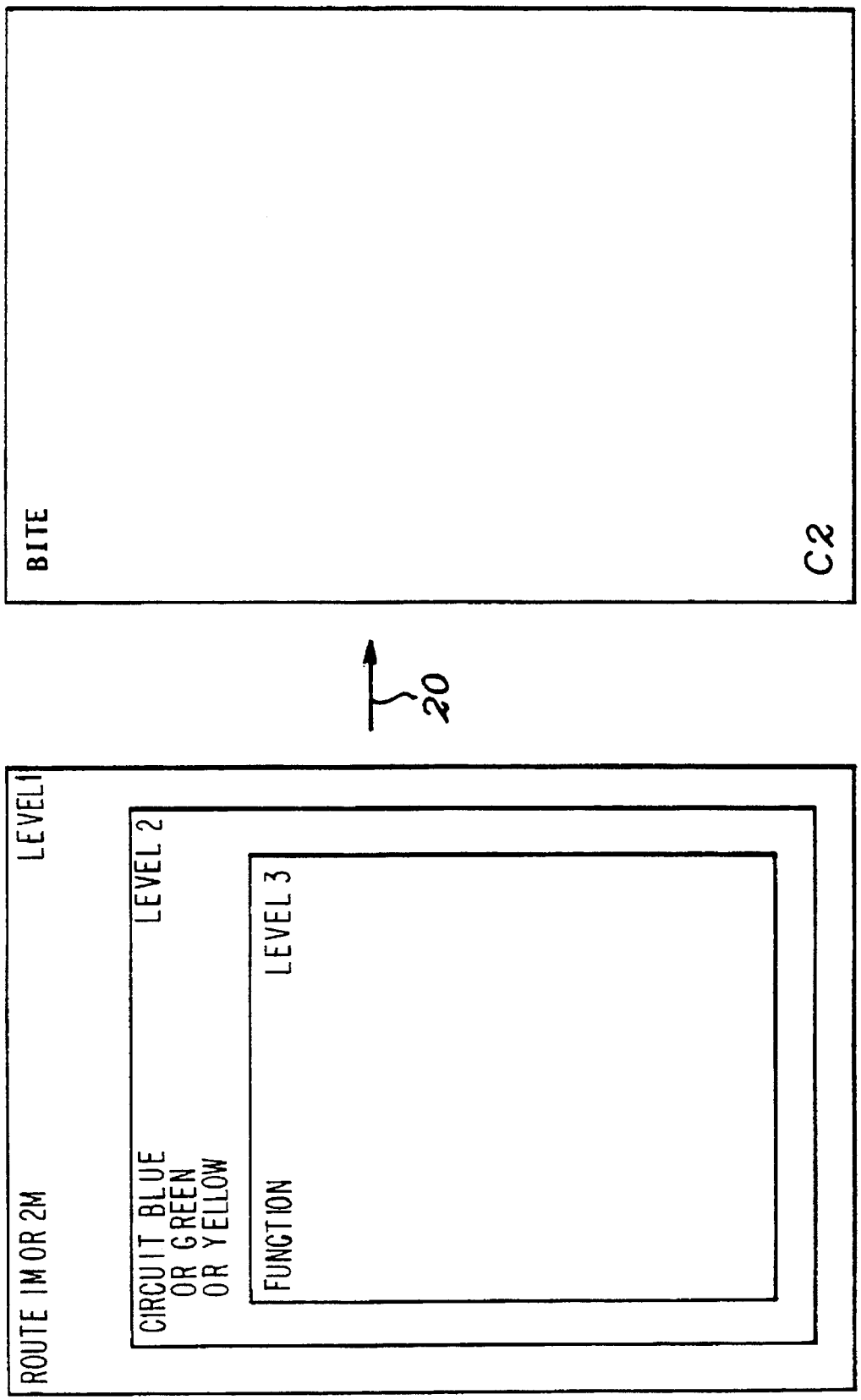
FIG. 4 illustrates the segregation of the circuits of the system according to the invention.

Referring to FIGS. 3 and 4, in order to maintain the different segregation levels illustrated in FIG. 4, the signals pass to the board C2 (arrow 20) via very strong impedances or even optical couplers. This ensures the necessary isolation. Also, multiplexers-demultiplexers are used in order to limit the overall dimensions of the connectors and boards. The "Bite" function can in no case interfere with the functional part of the computer. No reversibility is possible in the connections established between the functional part and the "Bite" function management unit. The "Bite" function is a maintenance function, which is operationally passive. It can therefore be implemented by a single microprocessor without any deterioration of the operational segregation. The architecture of board C4 maintains the segregation levels 1 and 3, as defined hereinbefore.

For producing-electrical components COMPi, it is advantageous to choose EPLD technology making it possible to maintain the necessary architectural and functional segregation. Erasable Programmable Logical Device (EPLD) components group within the same package a large number of logic AND, OR, NAND and NOR functions. It is not difficult to configure these functions in order to obtain a circuit in accordance with a desired logic equation. Once obtained, it is comparable with an equivalent circuit obtained with separate logic gates. Following the complete erasure of the configuration by any adequate tool, it is possible to reconfigure the component with a new logic equation. This property gives considerable flexibility to EPLD technology and this can be advantageously used for the development of the HSMU computer and its possible evolutions.

Figure 5:
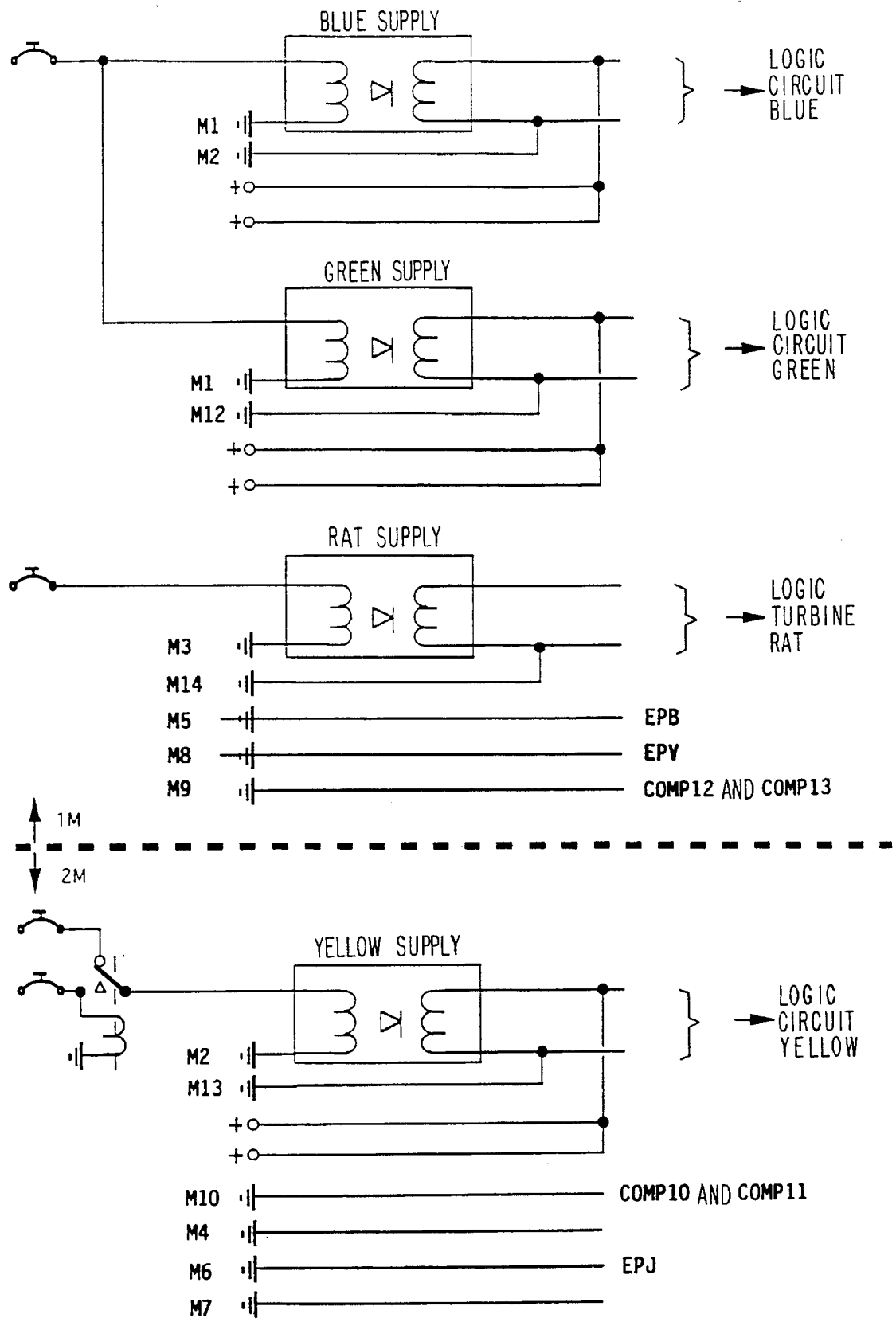
FIG. 5 illustrates the mass breakdown architecture in the system according to the invention.

The mass breakdown architecture of the system according to the invention is illustrated in FIG. 5 and maintains the required segregation. Each earth or ground plan of each circuit has a tree-like architecture in order not to contain a ground loop. The ground circuits liable to be traversed by relatively high currents are brought about by means of specific connections in order not to generate common mode potentials on the earth or ground of the logic functions (controls of electropumps).

The system according to the invention advantageously makes it possible to implement a certain number of functions which will now be successively analyzed. For reasons of language simplification, reference will be made hereinafter to green, yellow or blue electric pumps for designating the electric pumps of the green, yellow or blue circuits.

CONTROLLED AND MONITORING FUNCTION OF THE GREEN ELECTRIC PUMP

The green electric pump is manually controlled on the ground or in flight by the action of a pulsed push-button light located on the overhead or ceiling panel of the cockpit. The HSMU computer manages this pulsed manual control. In order to ensure the safety of maintenance personnel, the manual control is automatically brought to its stop state following an electric power breakdown.

Figure 6A:
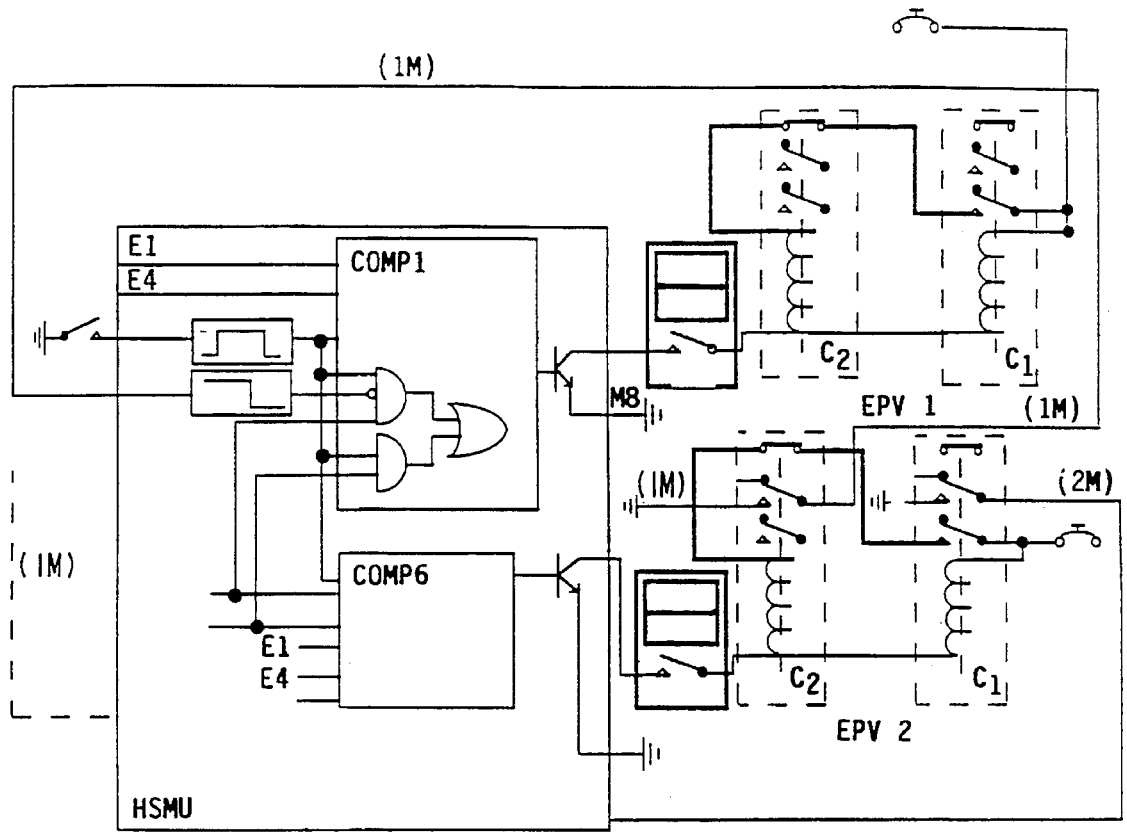
FIGS. 6A & 6B are schematic diagrams illustrating the control function of the electric pump of a hydraulic circuit for two aircraft types, one having two and the other four engines.

On a two-engine type aircraft, as shown in FIG. 6A, the two green pumps EPV 1 and EPV 2 are started up in succession by a sequential logic circuit. This prevents the automatic operation of the yellow electric pump during the operation of the green electric pumps, but allows such operation when the green electric pumps are stopped, so as not to overload the electric power system.

In the case of a failure of one of the two engines driving a green pump on take-off, when the landing gear lever is in the "UP" position the landing gear retraction operation can be performed as rapidly as with the normal hydraulic supply of the engine-driven pumps. This eliminates drag due to aerodynamic loading on the down gear, so as to enable the aircraft to climb so that it will fly over any obstacles located beyond the runway (there is a minimum stipulated altitude to be cleared at the end of the runway).

When the landing gear lever is positioned on "UP" and the other automatic routing conditions for the green pumps are satisfied, the condition "m" does not permit the activation by the component COMPi of the exit or extension which controls the green electric pump EPV1. Only the exit or extension of component COMP6 controlling the green electric pump EPV2 is activated. When the push-button light DEF/ARR (fault/stop) is in the normal position to ensure the continuity of the control, the contactor relay C1 of EPV2 closes to control the relay C2 of EPV2 and the prevention of the yellow electric pump by condition "n", when electric pump EPV2 starts. As soon as the contactor C2 of EPV2 is closed, the "n" condition activates a time delay of e.g. 500 milliseconds after which COMP1 activates the contactor C1 of EPV1, via the push-button light DEF/ARR, which is positioned on "normal". When C1 of EPV1 is closed, its auxiliary contact authorizes the control of C2 of EPV1, which brings about the starting of electric pump EPV1. Thus, there is accomplished the desired sequential successive starting condition.

When the time delay dependent on the landing gear lever has elapsed, e.g. 25 s, the two controls of the electric pumps EPV1 and EPV2 are deactivated and the green electric pumps 1 and 2 stop.

Condition "n" again authorizes the operation of the yellow electric pump as soon as the contactor C1 of EPV2 is inoperative. The push-button lights DEF/ARR enable the pilot to prevent the operation of each electric pump.

Figure 6B:
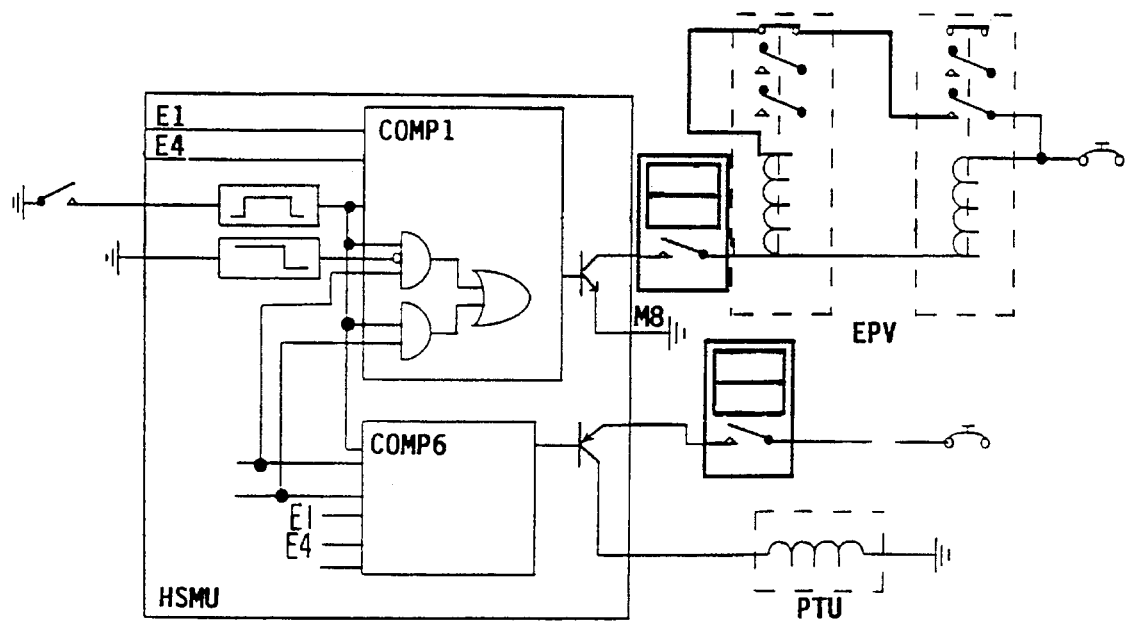

On a four-engine aircraft type, as shown in FIG. 6B, the green electric pump EPV is automatically controlled on the ground for taxiing with the internal engines only. It is automatically controlled in flight, during the retraction of the landing gear, in the case of an engine failure on take-off. The electrovalve of the pressure transfer unit PTU, consumes little current, which permits the simultaneous operation of the PTU and the green electric pump EPV. The permanent grounding of the "m" condition neutralizes it and the "n" condition is not wired, because it is unnecessary, the case of simultaneous loss of the two engines on take-off, one driving a green pump and the other a yellow pump not being considered.

The level and temperature of the liquid and the pressure of the air in the tank supplying the electric pump, as well as the pressure produced by the latter when controlled or its temperature are monitored. The HSMU computer initiates a warning to the cockpit in the case of a malfunction. The warnings linked with the temperature of the fluid or the electric pump are maintained on stopping the pump until the overheating disappears.

Warning Function of the Engine-driven Pumps

The level and temperature of the liquid and pressure of the air in the tank supplying a pump, as well as the pressure which it produces when the engine functions on the ground or in flight, or its temperature are monitored, The HSMU computer initiates a warning to the cockpit in the case of a malfunction. This function is identical for each pump of the engines.

Control and Monitoring Function of the Blue Electric Pump

The blue electric pump EPB is manually controlled on the ground or in flight by action on a pulsed push-button light on the overhead panel of the cockpit. For maintenance personnel safety reasons, the manual control is automatically brought to the stop state in the case of an electric power supply breakdown. The automatic control of the blue electric pump in the case of an engine failure on take-off is optional. Its activation is brought about by the grounding of two pin-programme wires.

The blue electric pump warning is carried out on the same basis as that of the green electric pump, but with the following difference. When the automatic control is not activated, the alarms linked with the temperature of the electric pump or the tank are only activated if the pump is controlled. This is justified by the fact that the lighting up of a fault light leads the crew to act on the corresponding push-button light in order to stop the considered control.

In the case of the control of the blue electric pump, without automatic control, the "fault" light is located on the pulsed push-button and there is no "fault-off" push-button light. When the electric pump is stopped, the illumination of the "fault" light would lead the crew to make the electric pump operate, which would be opposite to what was desired.

Control and Monitoring Function of the Yellow Electric Pump

The yellow electric pump EPJ is manually controlled on the ground or in the air by the action on a pulsed push-button light in the overhead panel of the cockpit. For maintenance personnel safety reasons, the manual control is automatically brought to its stop state in the case of an electric power supply breakdown.

It is also controlled on the ground for the manipulation of the cargo doors. When the aircraft is only electrically supplied by the service bar on the ground, a partial supply of the computer is brought about in order to ensure the operation of the yellow electric pump EPJ during the manipulation of the cargo doors.

For maintenance personnel safety reasons, the leak measurement valve of the yellow hydraulic circuit is automatically closed during the control of the cargo doors. This prevents any untimely movement of the flight controls. For the same reasons, the operation of the pressure transfer unit (from the yellow to the green circuit) is inhibited and an operation prevention signal is transmitted to the control computer for the slats and trailing edges. At the end of door manipulation, the leak measuring valve of the yellow circuit is kept closed for a few seconds in order to permit the pressure accumulator of the circuit to empty by internal leaks of the equipments and thus prevent any untimely movement of the flight control surfaces.

The yellow electric pump EPJ is automatically controlled in flight for the retraction of the flaps on take-off in the case of a failure of the engine driving the yellow engine-driven pump. If the engine stops when cruising, the yellow electric pump is only started up during the approach phase, when the extension of the flaps is controlled.

When the automatic control of the yellow electric pump is activated, it remains in this state for the remainder of the flight. The yellow electric pump signalling or warning is carried out on the same basis as that for the green electric pump.

Flight Inhibition Function of the Control of the Closing of the Internal Leak Measuring Valves As soon as the aircraft is in flight or its speed exceeds 100 knots, the computer prevents the manual closure of the internal leak measuring valves, in order to guarantee the primary flight control supply. However, the internal leak measuring valve of the yellow circuit is automatically closed during the manipulation of the cargo doors on the ground.

Control and Monitoring Function of the Ram Air Turbine (RAT)

The automatic control of the extension of the RAT is activated in flight, the aircraft speed exceeding 100 knots, if one of the three following configurations occurs:

stoppage of all engines, total loss of electric power, level drop alarm in the two hydraulic circuits.

The unlocking solenoid of the RAT is activated for only a few dozen seconds, so as to prevent any deterioration occurring thereto.

As soon as the manual or automatic control of the exit or extension of the RAT is activated, a signal is transmitted to the flight control computers in order to limit the displacement speed of the movable surfaces. The maximum displacement speed of the flight controls on several axes simultaneously requires a pressure-flow pair which cannot be supplied by the RAT alone. This limitation signal is maintained throughout the flight and for a few minutes following landing.

Control and Monitoring Function of the Pressure Transfer Unit (PTU)

A hydraulic pressure transfer unit transmits energy from one circuit to another without any fluid exchange. The pressure transfer unit of the yellow circuit to the green circuit can be optional on certain aircraft types. It can be replaced by a second green electric pump which is optional on other aircraft types.

The control and monitoring function is common to the pressure transfer unit and to the second electric pump. This function is activated by the grounding of the two pin-programme wires. The pressure transfer unit or second electric pump functions under the same conditions as the first basic green electric pump and the monitoring function is identical.

On the ground, for maintenance personnel safety reasons, the control of the cargo door inhibits the control of the pressure transfer unit if the latter is not already operating. In the opposite case, the pressure in the green circuit is present because it is necessary for the operation of the PTU, so that the operation of the yellow electric pump is inhibited.

Control Function of the Automatic Closing of the Hydraulic Supply Shutoff Valves of the Green Circuit In the case of a drop of fluid level in the tank of the green circuit, detected by the low level detecting microcontact and confirmed by the decoding of the level transmitter, the hydraulic supply shutoff valves of the green circuit are automatically closed and remain in this state until on the ground. This isolates the external leak if it is relative to one of the two engines driving a green pump. The fluid quantity in the suction line of the engine pump not suffering from a leak is delivered to the tank, leading to a rise in fluid level of a few liters. If a drop in fluid level is also detected on one of the other tanks, the RAT is automatically extended out, which repressurizes the green circuit.

This new function has been designed to obviate the effects of an engine explosion which could affect the three hydraulic circuits (very improbable hypothesis).

Pulse Control Function on a Push-button Light

The push-button lights are located on the overhead panel of the cockpit.

The Hydraulic System Management Unit, HSMU, computer receives pulses from the control push-button lights of the electric pumps or the pressure transfer unit and performs the following sequence:

- on energizing, the control is not activated,
- for the first pulse, the control is activated and remains activated,
- on the second pulse, the control is no longer activated,
- on the third pulse, the control is activated, etc.
- in the case of a microbreak in the current, the control returns to the non-activated state and is reactivated by a supplementary pulse.

Possible Use Function on Several Aircraft Types

To permit the use of the system according to the invention on several different aircraft types, e.g. two types, the system incorporating the principles of the present invention has several characteristics which will now be analyzed.

Pin-program Function

Two connections which may or may not be connected to the aircraft earth or ground, as close as possible to the computer, make it possible to implement an aircraft identification pin-program by the computer. The two pin-program connections are passed to the "Bite" microprocessor. A non-parity rule between these two connections has been defined so as to be able to verify the cooperation thereof (a single connection connected to the aircraft earth). When one of the connections is connected to earth or ground and the other is not, the computer is considered to be installed on an aircraft of a first type (aircraft 1). In the opposite case, the computer is considered to be installed on an aircraft of a second type (aircraft 2).

If neither or both of the two connections is connected to ground, the "Bite" microprocessor generates a fault message indicating a pin-program fault. However, the aircraft functional part of the computer continues to fulfill its functions. For each function, the priority of the operation per pin-program fault in the case of a functional difference between an aircraft of the second type compared with that of the first is defined by the choice which it is possible to make during the study of the introduction of the pin-program into the equation of the function.

Six other connections which may or may not be connected to the aircraft ground, as close as possible to the computer, make it possible to implement a pin-program for the validation of the options by the computer. A parity rule between these six connections is defined so as to be able to verify the cooperation thereof (even number of connections connected to the aircraft earth or ground). When the parity rule is not verified, the optional function is not activated and the "Bite" microprocessor indicates the pin-program fault. The six pin-program connections are passed to the "Bite" microprocessor. The six connections are distributed to the COMPi components in combinations of three connections. Each three-connection combination has three arrangements of connection pairs.

Each combination of three connections is passed to a COMPi component. The distribution of the combinations of the three connections between the components is carried out so that each component receives only one pin-program pair, the two other pairs being shared with one or more other components.

With a very reduced number of connections, this distribution makes it possible to provide for the allocation to each function (a COMPi component) of a specific option, and two other options may or may not be linked with another option affecting another function (another COMPI component).

Engine-driven Pump Signalling

In an aircraft type 2 embodiment with four engines each equipped with a hydraulic pump and an aircraft type 1 having two engines each equipped with two engine-driven pumps, the segregation of the routes of the engine circuits is as follows (see FIG. 7):

For aircraft type 2 (thick lines 32): route 2M is allocated to engine M1 (green pump PV), route 1M is allocated to engine M2 (blue pump PB), route 2M is allocated to engine M3 (yellow pump PJ), route IM is allocated to engine M4 (green pump PV), For aircraft type 1 (fine dotted lines 33): route IM is allocated to engine MI (green and blue pumps), route 2M is allocated to engine M2 (green and yellow pumps).

Figure 7:
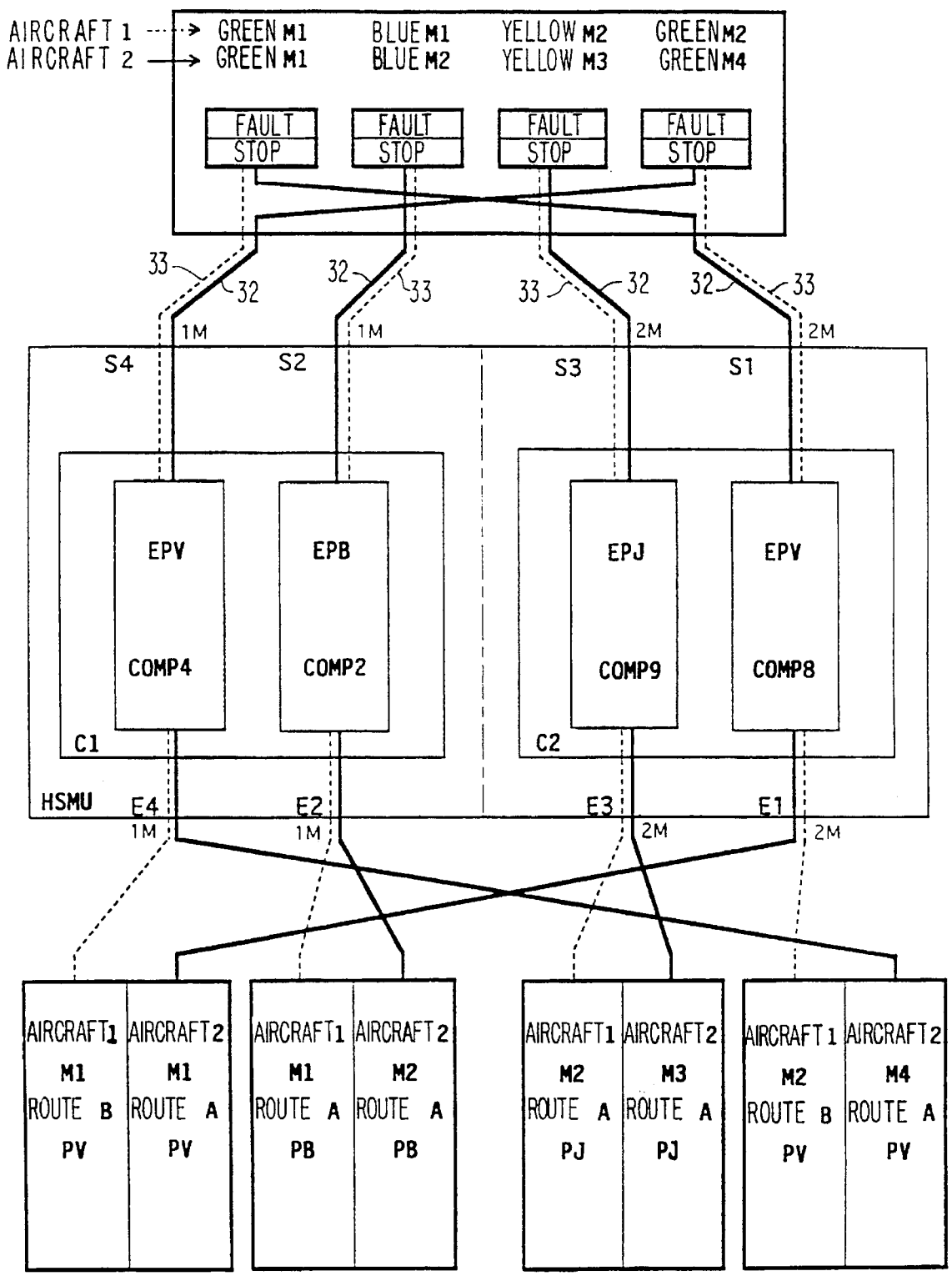
FIG. 7 illustrates the segregation of the routes of the engine circuits for these two aircraft types.

As shown in FIG. 7, a component COMP4 performs the processing of information relative to the green pump of engine M4 when the computer HSMU is installed on a second type of aircraft and that of the informations relative to the green pump of engine M1 when the computer HSMU is installed on an aircraft of the first type.

In the same way, a component COMP8 effects the processing of informations relative to the green pump of engine M1 when the computer HSMU is installed on aircraft type 2 and that of the information relative to the green pump of engine M2 when the computer HSMU is installed on aircraft type 1.

The aircraft type 1-aircraft type 2 identification pin-program enables the maintenance system integrated into the computer to choose fault messages adapted to the aircraft type on which it is installed.

Running Engine or Stopped Engine Signalling

On aircraft type 2, a discrete signal of the mass/open type transmits to the computer the state of each engine (running or stopped), as a function of whether N2 is above or below 50%. This signal is generated by channel A of the Full Authority Digital Electronic Control or FADEC computer, which is a digital computer ensuring the engine regulation functions and has the special feature of operating with a high safety requirement under severe conditions because it is fixed directly to the body of the engine (said computer having two channels A and B).

On aircraft type 1, a discrete signal per channel A or B of the FADEC computer of each engine retransmits to the HSMU computer the engine state. Thus, for both aircraft types, the HSMU computer receives four information signals, which correspond to the running or stopped state of the engines.

Function Indicating the Hydraulic Tank Filling Correction as a Function of the Fluid Temperature This new function is important on large capacity circuits for which the volume variation due to the variation in the fluid temperature is great (on certain aircraft types it can reach 15 liters or more). This function makes it possible to optimize the volume and filling level of the tanks in order not to reach a low fluid level or an overflow as a result of the temperature variation and consequently bring about a weight gain. The introduction of this novel function on certain aircraft is possible due to the presence of the HSMU computer.

Figure 8:
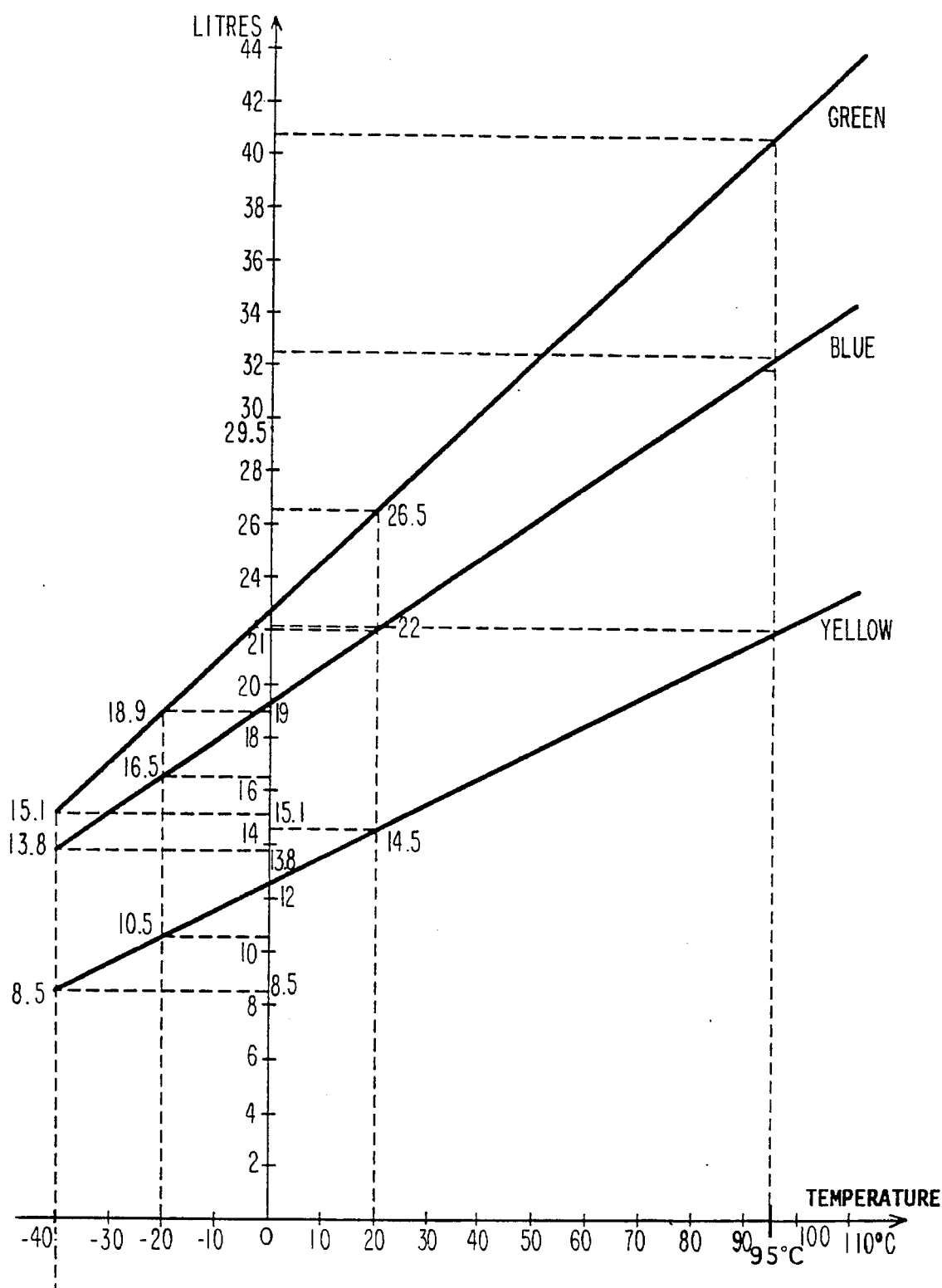
FIG. 8 is a graphical illustration of the volume variations in the tanks of the different hydraulic circuits.

As shown in FIG. 8, the capacity of the hydraulic tanks of certain aircraft (a few dozen liters) is such that the level of the fluid contained therein varies significantly when the temperature in the corresponding hydraulic circuit varies in the range −60° C. to +110° C. (extreme conditions, the normal range extending from −20° C. to +70° C., the alarm being at +95° C.). The volume expansion of the fluid contained in each hydraulic circuit (tank, lines, equipments, jacks, etc.) is delivered to the corresponding tank. The total capacity of a hydraulic circuit can exceed 200 liters, so that the volume expansion resulting from the encountered temperature variations is very significant.

If no account is taken of the temperature for defining the adequate level during tank filling corrections there can either be tank fluid overflows requiring the cleaning of the area because the fluid is highly corrosive, or can lead to low level alarms during flight, leading to the operational loss of the corresponding circuit.

From each tank the computer receives analog information proportional to the fluid level in the tank. A temperature probe located on the fluid return line in the immediate vicinity of the tank enables the computer to calculate the fluid temperature value. On the basis of informations such as the fluid volume in the hydraulic circuit, the mean volume expansion coefficient of the fluids used, the temperature of the fluid returning to the tank, the coefficient correcting the non-uniformity of the temperature in the circuits, the computer evaluates the thermal contraction or expansion of the fluid, which is delivered (or sucked, if appropriate) into the tank.

As the tank is cylindrical for the part corresponding to the variation range, there is a direct correlation between the volume variation and the liquid level in the tank. This makes it possible to define the fluid quantity which must be added or removed to fill the tank to its optimum level.

The centralization in the computer of the necessary informations has made it possible to calculate for each tank an analog signal controlling, via a four-position selector (one for each green, blue or yellow circuit and one for stop), a filling level indicator on the ground corrected of the variations due to the temperature compared with the nominal level for a temperature, of 200° C. This indicator is located on the filling panel of the fluid tanks for the hydraulic circuits.

Due to the filling correction indication as a function of the temperature it is possible to avoid any fluid overflow by excessive filling following a temperature rise, but in particular to prevent a low level alarm by inadequate filling, following a drop in the fluid temperature.

Figure 9:
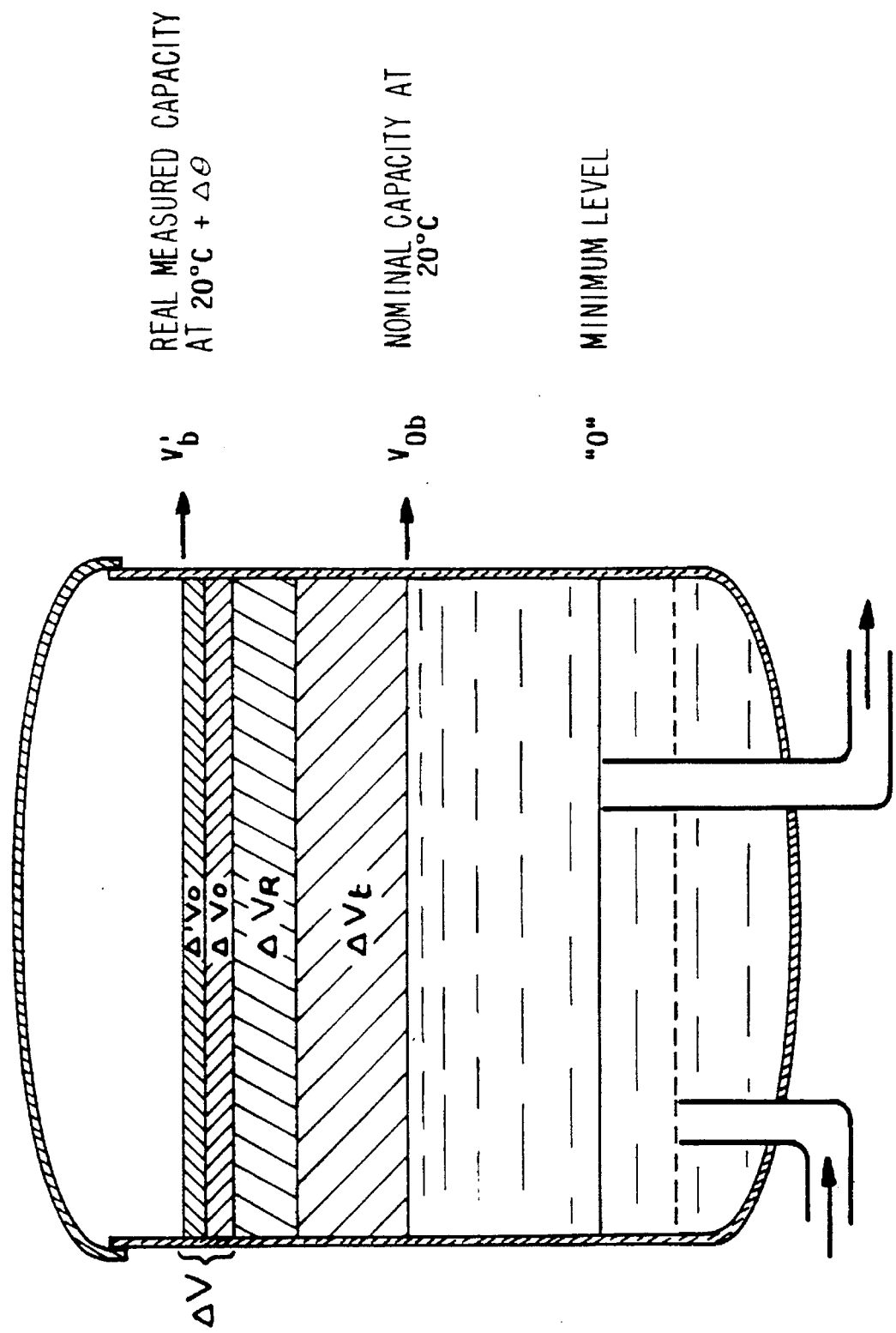
FIG. 9 is a sectional side view of a tank of a hydraulic circuit.

FIG. 9 illustrates in exemplified manner the tank of the green circuit.

With the following variables:

$V_{ob}$: nominal filling level at 20° C., $V_t$: volume of the tubes, considered invariable with temperature variations, $\Delta\theta$: variation in the fluid temperature compared with 20° C., $\Delta V_t$: expansion of the lines at 20° C.+$\Delta\theta$, delivered into the tank, $\Delta V_R$: expansion of the nominal filling volume of the tank at 20° C.+$\Delta\theta$, $\Delta V_o$: volume of the excess fluid at 20° C., $\Delta'V_o$: expansion at 20° C.+$\Delta\theta$ of the fluid in excess at 20° C., $\Delta V$: fluid in excess at 20° C.+$\Delta\theta$=$\Delta V_o$+$\Delta'V_o$, we have the relation:

$$\Delta V = \Delta V_o(1+0.8k\Delta\theta), \quad (1)$$

0.8 being an example of a mean coefficient which is a function of the temperatures encountered affecting the different parts of the circuit:

$k=9.18*10^{-4}$ (thermal expansion Skydrol module).

The excess fluid at 20° C.+$\Delta\theta$, which is the volume of the fluid which it is necessary to remove when the reading takes place at 20° C.+$\Delta\theta$ is equal to $\Delta V$, because it is fluid at the temperature 20° C.+, $\Delta\theta$ which is removed. This excess fluid V is equal to the difference between the quantity measured at 20° C.+$\theta$:$V'_b$, and the sum: nominal filling volume at 20° C., plus volume expansion in the tubes, plus expansion of the nominal filling volume, i.e.

$$\Delta V = V'_b - (V_{ob} + \Delta V_t + \Delta V_R) \quad (2)$$

with $\Delta V_t = V_t \cdot 0.8k\Delta\theta$ $\Delta V_R = V_{ob} \cdot 0.8k\Delta\theta$ $\Delta V = V'_b - 0.8k\Delta\theta(V_t + V_{ob}) - V_{ob}$ also $\Delta V = \Delta V_o(1 + 0.8k\Delta\theta) \quad (3)$ and thus $\Delta V = \dfrac{V'_b - 0.8k\Delta\theta(V_t + V_{ob}) - V_{ob}}{1 + 0.8k\Delta\theta}$ However, $\Delta V_o$ is the excess fluid reduced to 20° C., $\Delta V$ is the excess fluid at 20° C + $\Delta\theta$.

It is $\Delta V$ which must be indicated to the operator. It should be noted that $\Delta V$, $\Delta V_o$ and $\Delta\theta$ can be positive, negative or zero.

Automatic Closure Function of the Hydraulic Suppy Shutoff Valves and Automatic Extension of the RAT in the Case of An Engine Explosion Affecting the Three Hydraulic Circuits In the system incorporating the principles of the present invention, the novel function is taken into account in order to obviate the effects of an engine explosion, which would simultaneously affect all three hydraulic circuits (very improbable).

There is no simple device permitting the rapid detection of such an engine explosion, except for the monitoring of the liquid level in the tank of hydraulic circuit, whose pump is driven by the engine. Thus, the considered engine explosion affects the hydraulic circuit by breaking the line at the engine, which leads to a loss of fluid in the circuit (a hydraulic circuit not functioning without liquid). The detection of the level drop and the rapid closure of the valves isolating the leak make it possible to maintain the circuit operational by pressurizing it with the aid of an auxiliary pump. The supply shutoff valves of the suction lines of the two green engine-driven pumps are automatically closed in the case of a low level alarm of the green tank confirmed by the decoding of the liquid level gauge. The automatic exit or extension of the RAT is activated in the case of a second confirmed low level alarm affecting another hydraulic circuit.

Airborne Maintenance Function (Built in Test Equipment)—BITE

This function, which is included in the computer of certain aircraft types, has been extended to the control and monitoring system of the hydraulic circuits as a result of the HSMU computer, which centralizes and performs the processing of the necessary information.

The use of the "Bite" microprocessor consists of monitoring the state of all the computer input and output signals and of verifying the agreement between the state of each output as a function of the respective states of the inputs involved in each equation, which is recalculated by the microprocessor. In order to avoid a common error to the two hard and soft equations, the parameters are complemented at the input of the microprocessor and the equation of the latter takes account of this complementation. Therefore the equations are complementary and can consequently not contain a common error.

In the case of a disagreement confirmed for a few seconds, a fault message (within the computer) is emitted on the connection bus connecting the HSMU computer to the centralized maintenance computer. This fault is also stored in the memory associated with the "Bite" microprocessor.

When an input signal is not valid, e.g. a mass/open discrete signal which oscillates, an out of range analog signal, or when two discrete signals from two identical computers are in disagreement, a fault message incriminating the peripheral equipment in question is emitted and stored. The alarms belonging to the hydraulic systems are also stored in the memory of the HSMU computer. The computer memory is automatically erased on each aircraft take-off. The internal test of the computer is performed automatically whenever energized, as well as before the initiated test.

Initiated Test Function

Figure 10:
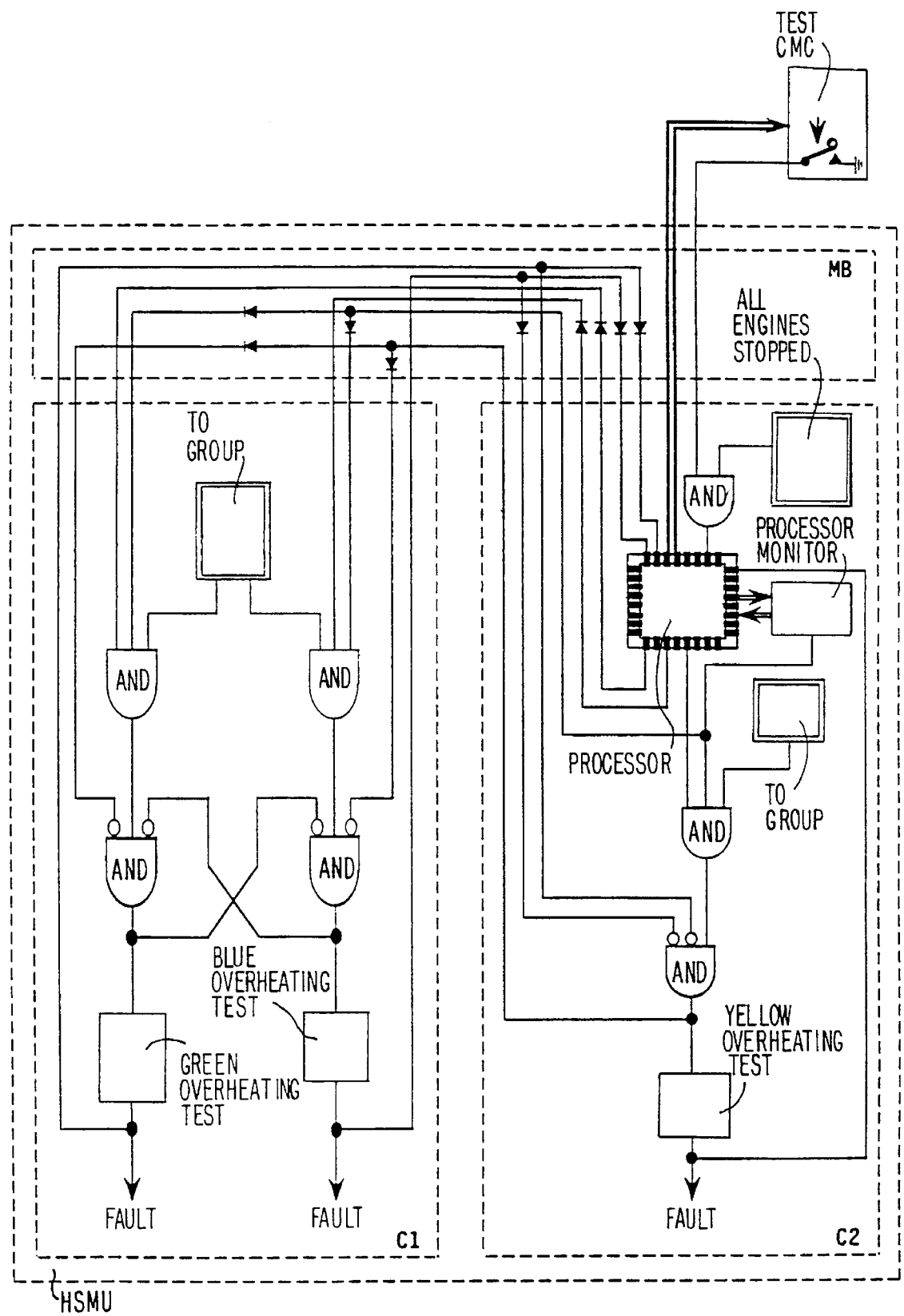
FIG. 10 is a schematic diagram illustrating an initiated test function.

An initiated test function for testing the computer and the overheating of the three hydraulic circuits is incorporated into the "Bite" microprocessor. The test is controlled from the centralized maintenance package located in the cockpit (CMC=centralized maintenance computer). This test leads to the lighting up of the control pushbutton lights of the green hydraulic circuit of the overhead panel for a few seconds and then those of the blue circuit, followed by the yellow circuit. The test is correct if the sequence takes place as described. In the case of a fault detected by the computer, a corresponding message is displayed on the screen of the control panel of the CMC. In order to maintain the defined segregation levels, the architecture of FIG. 10 shows the precautions taken, independent of the microprocessor, for preventing the simultaneous initiation of the test in flight.

The overheating detection test for the three hydraulic circuits is performed sequentially and successively in the order green, blue and yellow circuits.

The test initiated from the centralized maintenance computer can only be performed on the ground, with all the engines stopped. The activation of a green, blue or yellow output of the test prevents the activation of the outputs of the two others in circular permutation.

The multiple conditions which must be combined for the activation of the test are not implemented by the microprocessor, in order to eliminate any common point, and thus ensure a non-activation of the test in flight with an adequate safety level.

Each "fault" output gives rise to the lighting up of all the "FAULT" lights of the corresponding circuit on the overhead panel of the cockpit. The centralized maintenance screen displays the text generated by the HSMU computer, which indicates to the operator to monitor the state of the lights of the overhead panel and check the successive lighting up of the lights of the green, blue and then yellow hydraulic circuit. If no failure of the HSMU computer or its peripherals is detected by the "Bite", the "OK" test message is displayed on the screen. In the opposite case, an explicit message is displayed for each fault.

Figure 11A:
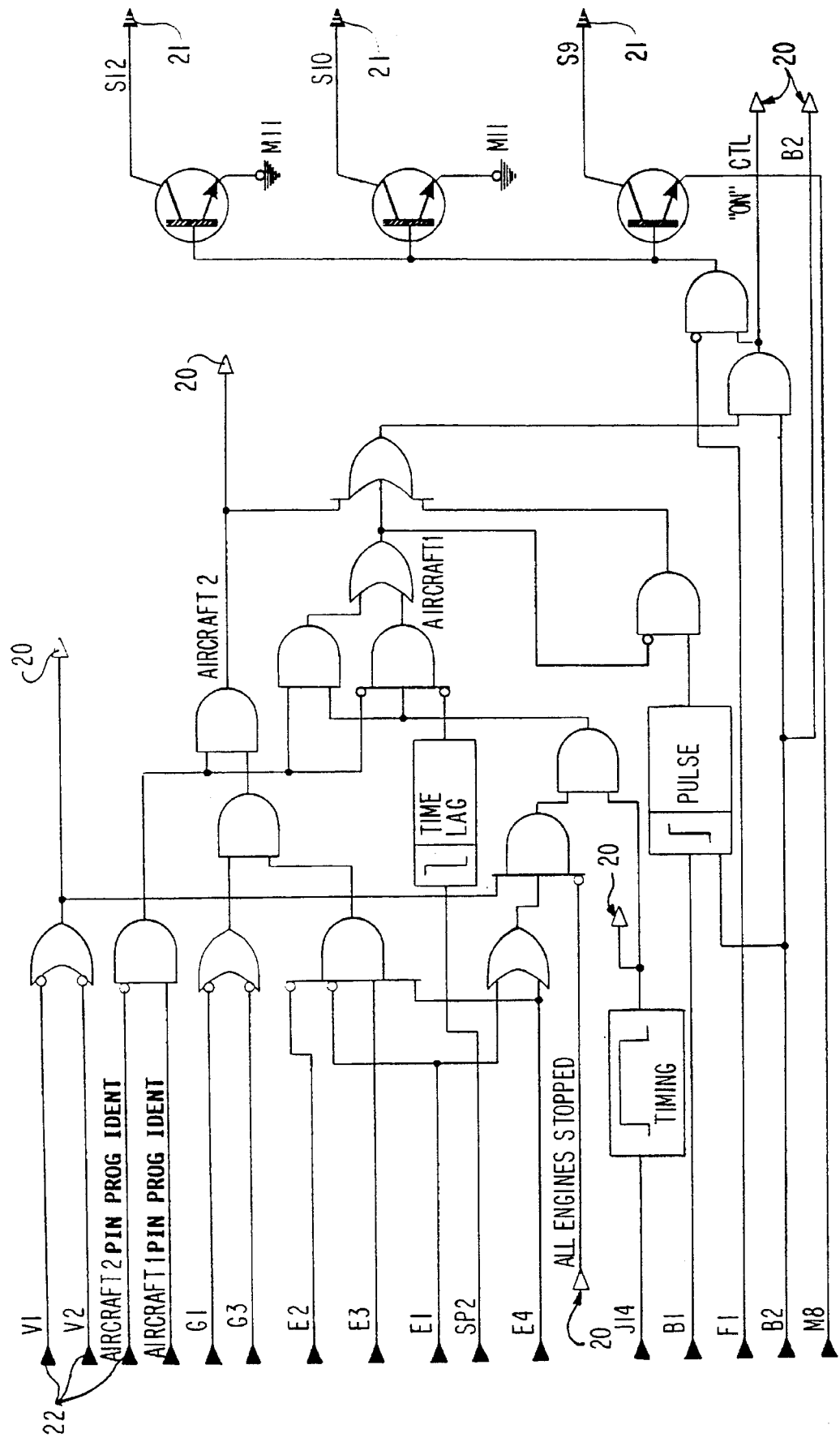
FIGS. 11 to 14 are schematic diagrams respectively illustrating several logic circuits of the system according to the invention.
Figure 11B:
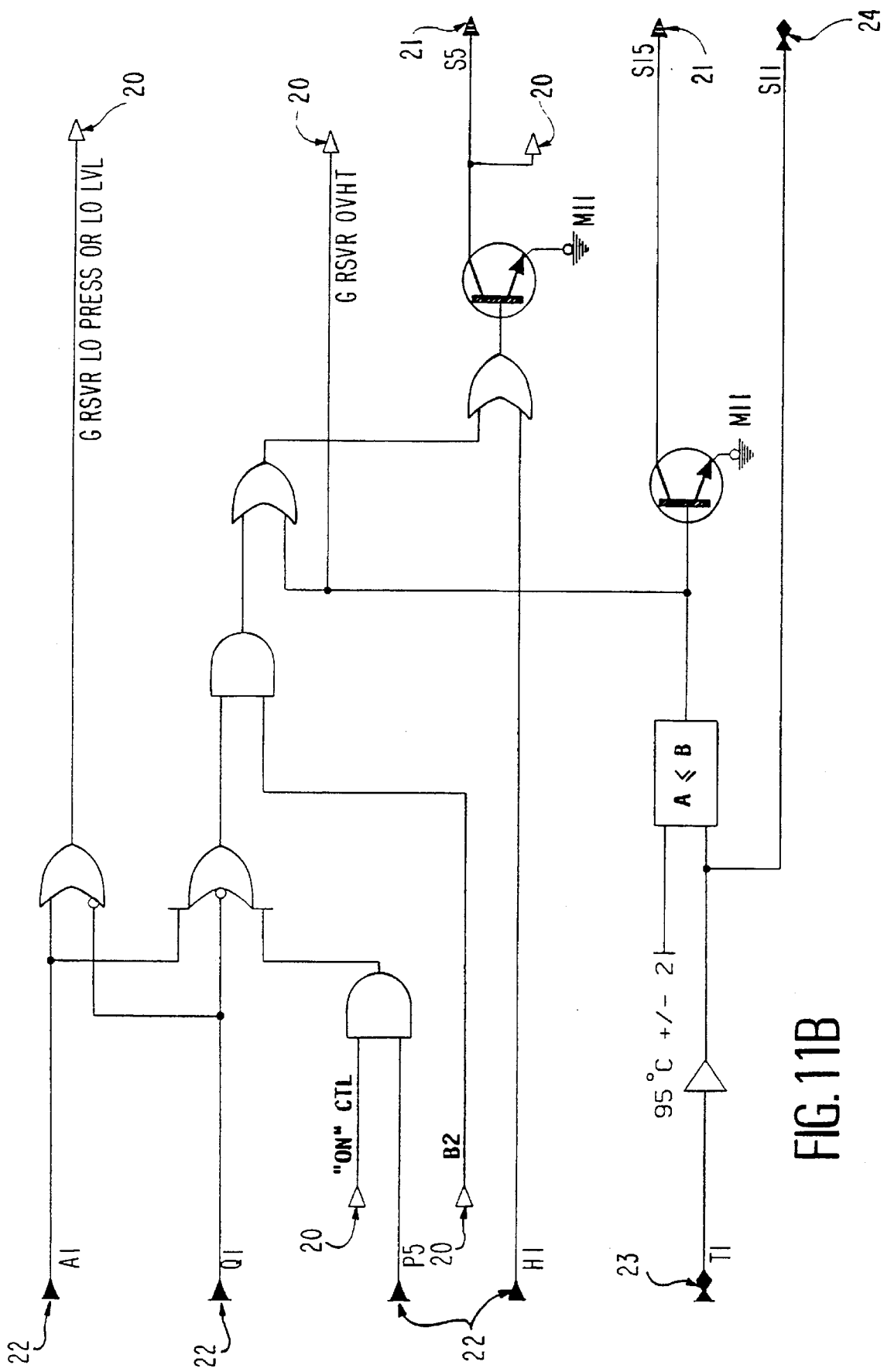
Figure 12:
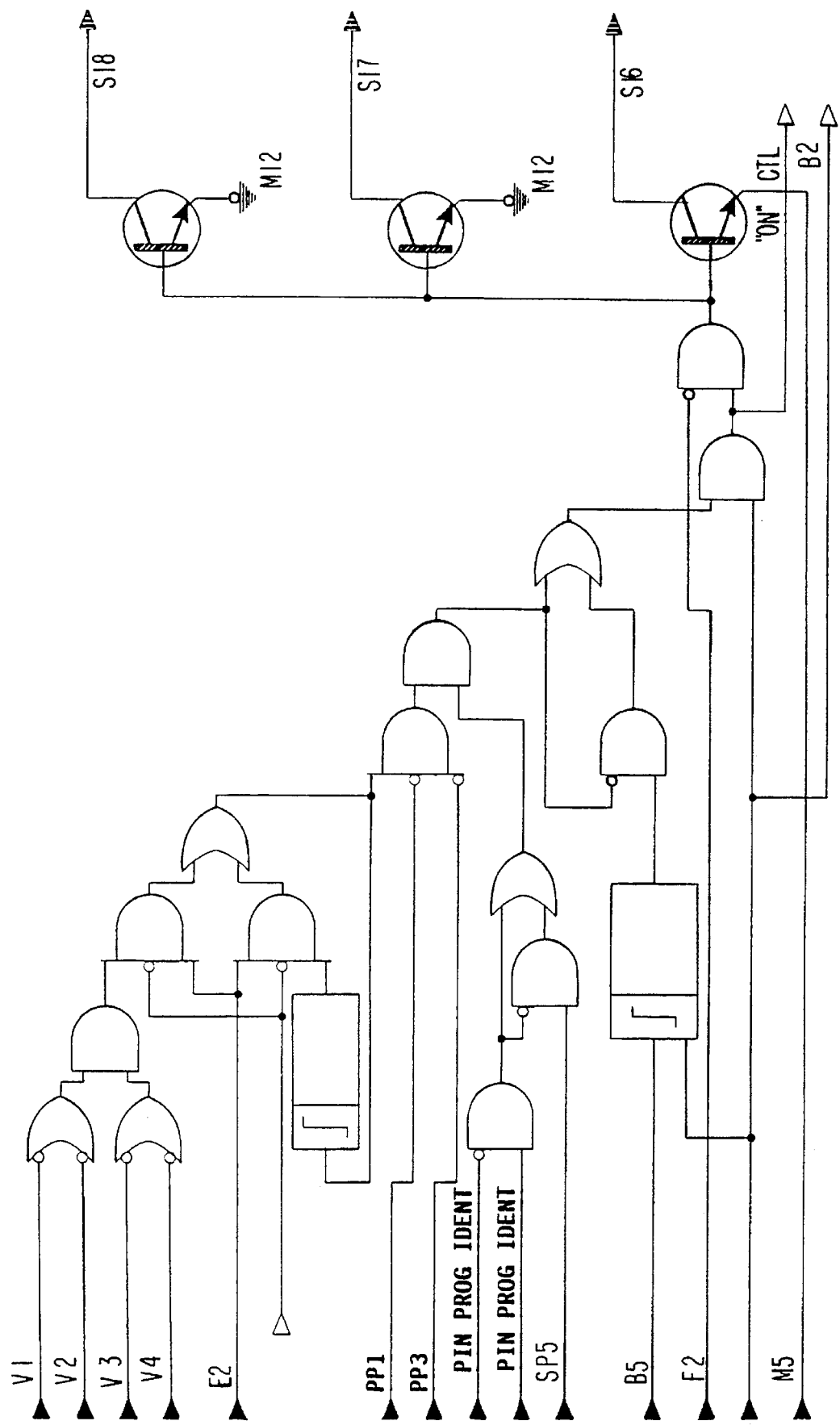
Figure 13:
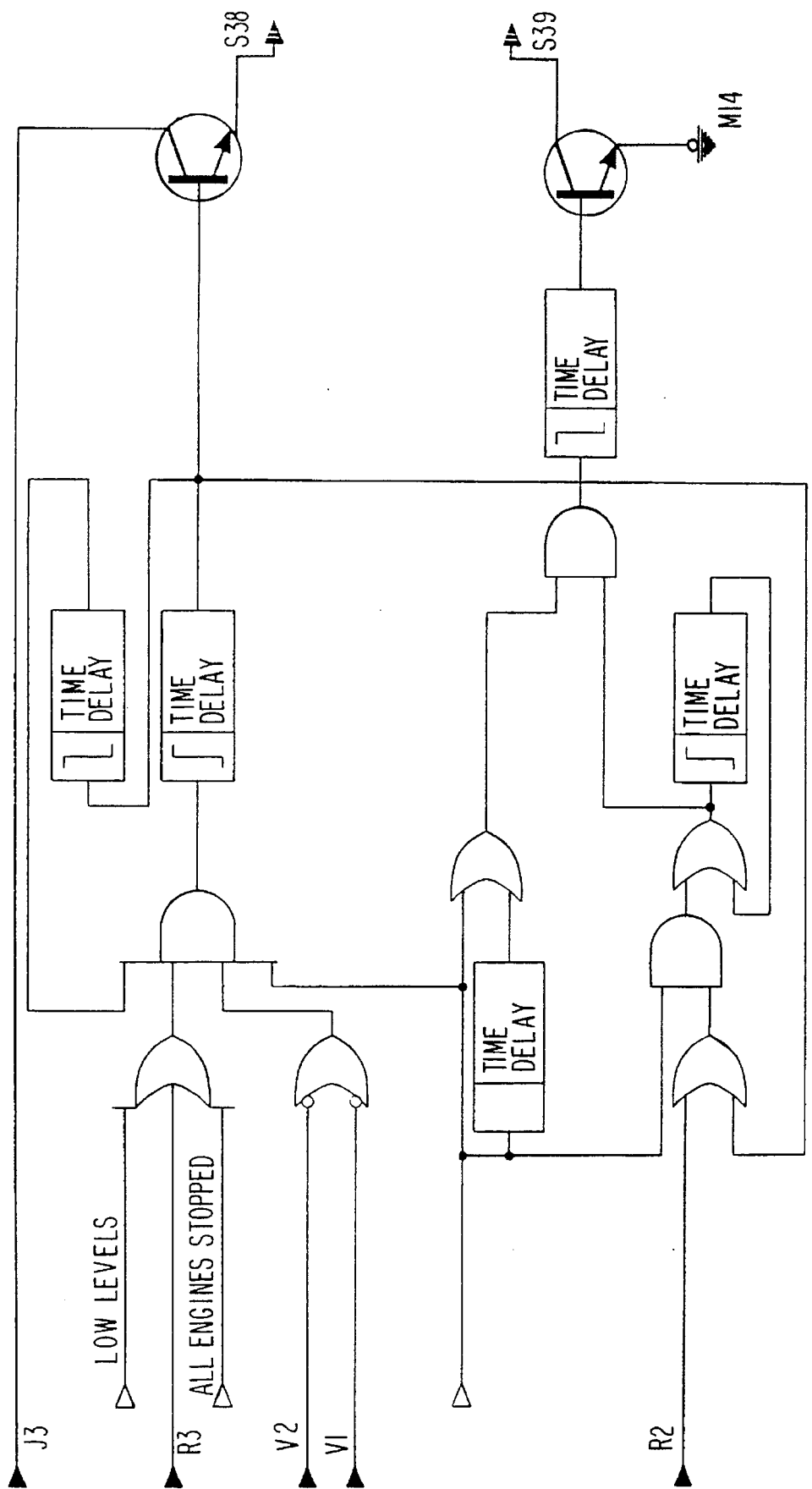
Figure 14:
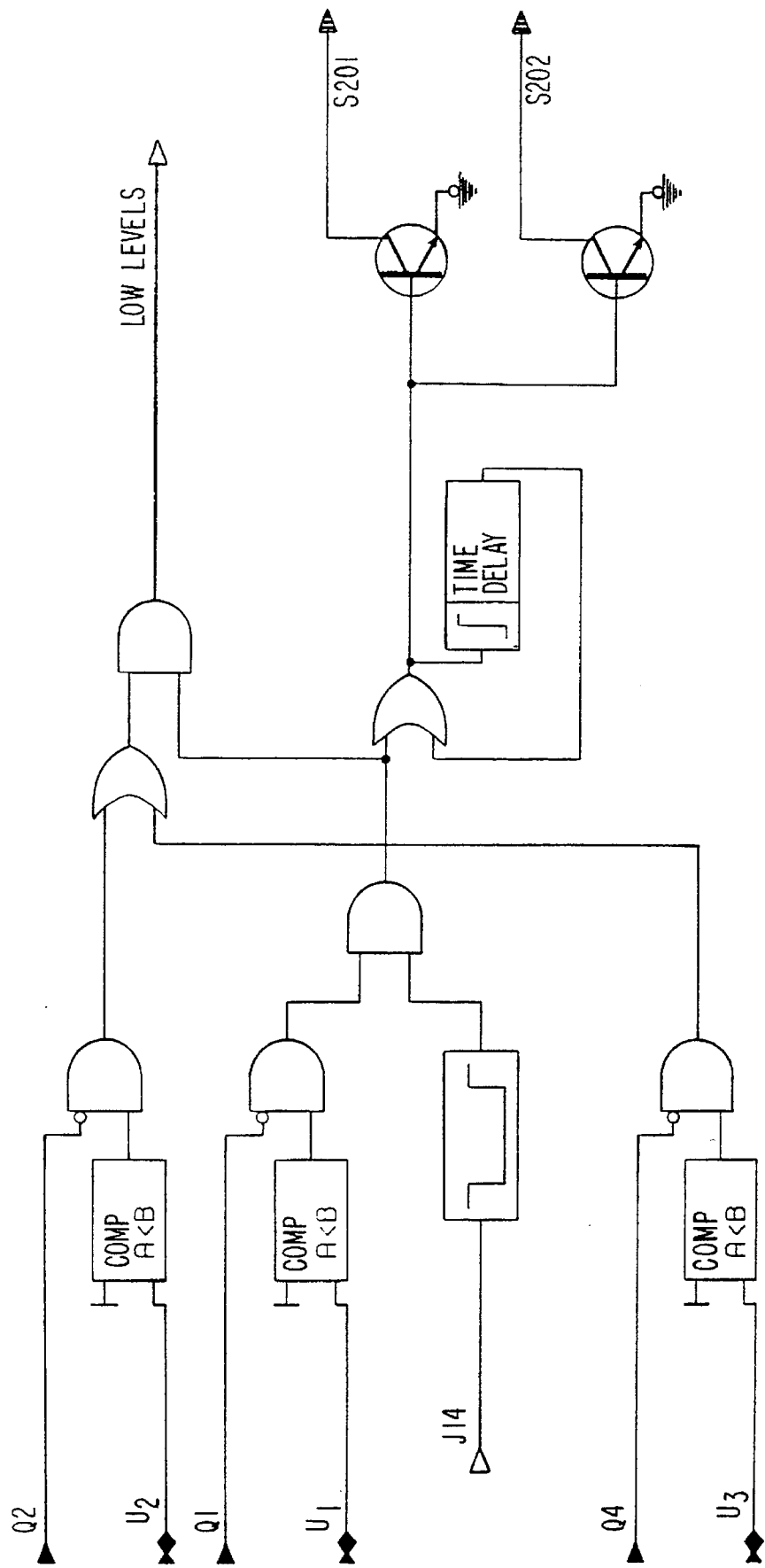

Consideration will now be given to several logic circuits of the system according to the invention given in exemplified manner and illustrated in FIGS. 11 to 13. FIGS. 11A and 11B illustrate the green electric pump control circuit. FIG. 12 illustrates the blue electric pump control circuit in which the pin-program controls appear. FIG. 13 illustrates the RAT control circuit. FIG. 14 illustrates a valve control circuit.

Referring particularly to FIGS. 11A and 11B, it is the input signals:

- V1, V2 which indicate that the speed of the aircraft is above or below 100 knots,
- GI, G3 which indicates if the aircraft is flying or on the ground,
- E1, E2, E3, E4 which indicate if the engines M1, M2, M3, M4 are operating or stopped,
- SP2 which is an input usable but not used (spare),
- ALL ENGINES STOPPED, which indicates whether all the engines are stopped, or if one or more are not stopped,
- J14 which indicates the position of the operating lever of the landing gear,
- B1 which is a pulse generated by the pilot on the pump manual control pulsed button,
- F1 which comes from the microbrake and phase unbalance detector monitoring the supply of the electric pump,
- B2 which indicates the position of a pushbutton enabling the pilot to stop the pump in the manual or automatic control mode,
- M8 which is the earth or ground for the control of the contactor relays controlling the electric pump,
- A1 which is a tank pressurization monitoring information,
- Q1 which is a low level alarm monitoring in the tank,
- P5 which is an indication of the circuit pressurized by the pump,
- H1 which is an electric pump overheating signal,
- T1 which is the temperature of the fluid in the tank; the output signals:
- S9 which activates the electric pump control power contactors,
- S12 which brings about the lighting up of the "control pump" light,
- S10 which copies S12 and is supplied to the alarm central computer,
- S5 which activates the "fault" light on the cockpit overhead panel,
- S15 which copies S5 and is supplied to the alarm central computer,
- S11 which is an analog output proportional to the temperature of the fluid in the tank used by the cockpit cathode ray tube signalling computer.

In the drawings the symbols 20 represent internally exchanged informations, symbol 21 logic outputs to the outside, symbols 22 logic inputs, symbols 23 and 24 inputs and analog outputs to the outside.

In the same way, in each logic circuit the value of the output signals is dependent on the value of the input signals in accordance with an equation defining the operation of said circuit. Advantageously COMPi components of the EPLD type are used (ASIS family), which can be reconfigured, using a very specific procedure, which makes it possible to have the possibility of modifying such equations, if necessary.

The thus defined system according to the invention has in particular the following advantages:

- a single HSMU computer common to several large capacity aircraft types, which ensures the control and monitoring functions of the aircraft hydraulic circuits, while maintaining the segregation rules in force in order to ensure the requisite safety level for bringing about aircraft certification;
- the retained architecture and the use of EPLD technology making it possible to maintain segregations;
- the novel system leads to a space and weight gain;
- the reliability and rapidity of the automatic operations, the novel functions permitted by the computer increasing safety;
- maintenance is facilitated;
- the flexibility of evolutions and the possibility of adapting to other aircraft complete the advantages offered by this system.

I claim:

1. System for controlling, in an aircraft a plurality of independent parallel hydraulic circuits having equipments supplying said circuits, said system having a first unit for monitoring said hydraulic circuits and for controlling said equipments supplying said circuits, said first unit having wire logic circuits requiring no programmable computing member and a second unit for recording the causes of any unsatisfactory operation, said system having electric circuits corresponding to said independent parallel hydraulic circuits and being subject to advanced segregation criteria comprising:

means for forming a level 1 segregation, which is a segregation of routes, permitting the passage of said electric circuits allocated to said independent hydraulic circuits;

means for forming a level 2 segregation, which is a segregation between said independent hydraulic circuits; and means for forming a level 3 segregation, which is a segregation between the functions of each hydraulic circuit using different components.

2. System according to claim 1 comprising a package in which a mother circuit board carries out the distribution of signals to different secondary circuit boards, and contains electronic components making it possible to distribute a signal to one or more secondary circuit boards, when necessary, while ensuring the necessary segregation level, and including wire connections between said mother board and each of said secondary circuit boards being carried out by independent line connectors for each board, in order to maintain the segregation between the circuits.

3. System according to claim 2, wherein a first circuit board is equipped with two line connectors through which signals of a first circuit are transmitted for one of said connectors and signals of a second circuit are transmitted for the other connector, wherein a second circuit board is equipped with two line connectors through which signals of a third circuit are transmitted for one of the connectors and some signals of the second circuit are transmitted for the other, wherein a third circuit board is equipped with two connectors through which signals of the first and second circuits are transmitted for one of the connectors and the signals of the third and second circuit are transmitted for the other connector, the distribution of the circuits within the same connector being carried out so as to spatially isolate the circuits from each other, said boards having two zones and wherein a fourth circuit board is equipped with a single line connector.

4. System according to claim 3, wherein said circuits are printed circuits and wherein four supply units are located on said fourth circuit board to bring about a spatial division of the surface of the board and the routings of tracks of connections can themselves be spatially separated between the different layers of the printed circuit and wherein one supply is allocated to the first, another to the first part of the second circuit, another to the third circuit and to the second part of the second circuit, and the last to the control circuit of a Ram Air Turbine.

5. System according to claim 1, wherein the components are in EPLD technology making it possible to maintain the necessary architectural and functional segregation, wherein each component used in the implementation of one of these functions can be used solely for that function and wherein when component networks are used, each component contains components allocated only to that circuit.

6. System according to claim 1, wherein each ground plane of each electrical circuit maintains a tree-like architecture so as to contain the ground plane.

7. System according to claim 1, wherein said second unit for recording causes of unsatisfactory operation performs a "Bite" function, which receives all the entering and exiting signals.

8. System according to claim 7, wherein said "Bite" unit is prevented from interfering with the functional part of the system, no reversibility being possible in the connections established between the functional part and the "Bite" microprocessor.

9. System according to claim 1, wherein said plurality of hydraulic circuits are installed in a multi-engine transport aircraft.

10. System according to claim 9 wherein at least one of the following functions is carried out:

the control and monitoring of each circuit, the manual and automatic control and the signalling of the electric pumps, the signalling of the engine-driven pumps, the in flight inhibition of the control of the closing of the internal leak measuring valve, the control and monitoring of a RAT, the control and monitoring of the one or more pressure transfer units, the control of the automatic closing of the hydraulic supply shutoff valves of the circuit, the pulsed control on a pushbutton light, the automatic closing of the hydraulic supply shutoff valves and the automatic exit of the RAT in the case of an engine explosion affecting all the circuits, airborne maintenance, an initiated test, the possible use on several aircraft types.

11. System according to claim 10, wherein hydraulic tanks are provided and the filling level and volume of the tanks is optimized so as not to reach a low level or an overflow due to temperature variations.

12. System according to claim 10, wherein hydraulic tanks are provided and analog information is received from each tank proportional to the fluid level in the tank, a temperature probe located on the fluid return line of the tank making it possible to calculate the fluid temperature value utilizing the fluid volume contained in the circuit, the mean volume expansion coefficient of the fluids used, the temperature of the fluid returning to the tank, and the correcting coefficient of the non-uniformity of the temperature in the circuits.

13. System according to claim 12, wherein an analog signal is calculated for controlling via a four-position selector, a filling level indicator on the ground, corrected of variations due to temperature, with respect to the nominal level at 20° C., said indicator being located on the hydraulic circuit fluid tank filling panel.

14. System according to claim 13, which satisfies the following equation:

$$\Delta V = \frac{V_b - 0.8k\Delta\theta\,(V_E + V_{ob}) - V_{ob}}{1 + 0.8k\Delta\theta}$$

with $\Delta\theta$ being the temperature variation compared with 20° C., $V'_b$ the quantity measured at 20° C.+$\Delta\theta$, $V_{ob}$ the nominal filling level at 20° C. and $V_t$ the volume of the lines.

15. System according to claim 10, wherein the manual control of each independent circuit is automatically brought to the stop state in the case of an electric power supply failure, the leak measuring valve of the third circuit being automatically closed during the control of the cargo doors in order to prevent any movement of the flight controls, the operation of the pressure transfer unit of the third circuit to the second circuit is inhibited and an operation interdiction signal is transmitted to the control computer of the slats and the trailing edges, wherein at the end of the manipulation of the doors, the leak measuring valve of the third circuit is kept closed so as to enable the pressure accumulator of the circuit to empty and thus prevent any movement of the flight control surfaces, the control of the cargo door inhibiting the control of the pressure transfer unit.

16. System according to claim 10, wherein in order to obviate the effects of an engine explosion, which would simultaneously affect all the hydraulic circuits, the system is able to detect a low level and close the valves isolating the leak to keep the circuit operational by pressurizing it with an auxiliary pump, the supply shutoff valves of the suction lines of the two engine-driven pumps of the second-circuit being automatically closed in the case of a low level alarm of the second tank confirmed by the liquid level gauge, the automatic exit or extension of the RAT being activated in the case of a second confirmed low level alarm from another hydraulic circuit.

* * * * *